(12) United States Patent
Kim et al.

(10) Patent No.: US 11,709,094 B2
(45) Date of Patent: Jul. 25, 2023

(54) SOUND INSPECTION METHOD AND INSPECTION APPARATUS FOR DISPLAY DEVICE INCLUDING SOUND GENERATOR

(71) Applicant: Samsung Display Co., LTD., Yongin-si (KR)

(72) Inventors: Kee Yong Kim, Hwaseong-si (KR); Chang Yeob Kim, Paju-si (KR); Jung Hun Sin, Seoul (KR); Han Su Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 437 days.

(21) Appl. No.: 16/989,782

(22) Filed: Aug. 10, 2020

(65) Prior Publication Data

US 2021/0048339 A1 Feb. 18, 2021

(30) Foreign Application Priority Data

Aug. 16, 2019 (KR) .......................... 10-2019-0100382

(51) Int. Cl.
*G06F 3/16* (2006.01)
*G01H 11/08* (2006.01)
(Continued)

(52) U.S. Cl.
CPC ........... *G01H 11/08* (2013.01); *G06F 1/1605* (2013.01); *G06F 3/16* (2013.01); *G10K 9/122* (2013.01);
(Continued)

(58) Field of Classification Search
CPC . G06F 1/16; G06F 1/1605; G06F 3/01; G06F 3/14; G06F 3/16; H04R 1/02; H04R 1/20; H04R 1/28; H04R 1/40; H04R 17/00; H04R 9/02; H04R 9/04; H04R 9/06; H04R 3/00; H04R 3/04; H04R 3/12;
(Continued)

(56) References Cited

U.S. PATENT DOCUMENTS

| | | | |
|---|---|---|---|
| 9,681,235 B2 | 6/2017 | Hosoda | |
| 2006/0071911 A1* | 4/2006 | Sullivan | .................. G06F 3/043 345/173 |

(Continued)

FOREIGN PATENT DOCUMENTS

| | | |
|---|---|---|
| JP | 2016-070823 | 5/2016 |
| KR | 10-2013-0118367 | 10/2013 |

(Continued)

*Primary Examiner* — Chanh D Nguyen
*Assistant Examiner* — Nguyen H Truong
(74) *Attorney, Agent, or Firm* — H.C. Park & Associates, PLC

(57) ABSTRACT

A sound inspection method of a display device and a sound inspection device including preparing a display device including a display panel and a sound generator disposed on a first surface of the display panel, placing a vibration sensor on a second surface opposite to the first surface of the display panel, vibrating the sound generator at a first reference frequency, vibrating the display panel, and then sensing a vibration of the vibration sensor that vibrates along with a vibration of the display panel; and determining whether a frequency of the vibration of the vibration sensor is included in a first threshold frequency region.

26 Claims, 18 Drawing Sheets

(51) Int. Cl.
  *H04R 29/00* (2006.01)
  *H04N 17/00* (2006.01)
  *G10K 9/122* (2006.01)
  *G06F 1/16* (2006.01)

(52) U.S. Cl.
  CPC ......... *H04N 17/004* (2013.01); *H04R 29/001* (2013.01); *H04N 2017/006* (2013.01)

(58) Field of Classification Search
  CPC . H04R 23/00; H04R 5/02; H04R 7/04; H04R 7/16; H04R 25/00; H04R 29/001; H01L 51/52; H01L 41/00; H01L 41/18; H01L 41/047; H01L 41/04; H01L 41/09; H01L 27/32; H05K 5/00; H05K 5/02; H05K 7/20; G01H 11/08; G10K 9/122; H04N 17/004; H04N 2017/006
  See application file for complete search history.

(56) References Cited

U.S. PATENT DOCUMENTS

| | | | |
|---|---|---|---|
| 2009/0015705 A1* | 1/2009 | Urakami | G03B 19/12 348/340 |
| 2012/0176413 A1 | 7/2012 | Kulik et al. | |
| 2018/0150053 A1* | 5/2018 | Takaoki | G05B 19/4062 |
| 2019/0158970 A1 | 5/2019 | Konno et al. | |
| 2019/0255567 A1* | 8/2019 | Lindemann | H04R 3/04 |
| 2020/0273444 A1* | 8/2020 | Bernal Castillo | G10K 9/20 |
| 2021/0337292 A1* | 10/2021 | Jang | G08B 6/00 |

FOREIGN PATENT DOCUMENTS

| | | |
|---|---|---|
| KR | 10-2014-0047983 | 4/2014 |
| WO | 2017110087 | 6/2017 |

* cited by examiner

SOUND INSPECTION METHOD AND INSPECTION APPARATUS FOR DISPLAY DEVICE INCLUDING SOUND GENERATOR

CROSS REFERENCE TO RELATED APPLICATION

This application claims priority from and the benefit of Korean Patent Application No. 10-2019-0100382 filed on Aug. 16, 2019, which is hereby incorporated by reference for all purposes as if fully set forth herein.

BACKGROUND

Field

Exemplary embodiments of the invention relate generally to a sound inspection method and apparatus of a display apparatus having a sound generator.

Discussion of the Background

With the advancement of the information age, demands for display devices for displaying images have increased in various forms. For example, such display devices are applied to various electronic devices, such as a smartphone, a digital camera, a notebook computer, a navigation device, and a smart television. A display device may include a display panel for displaying images and a sound generator for providing sounds.

A sound inspection device for inspecting sound performance of the sound generator may capture sound output due to the vibration of the sound generator using a microphone, perform a comparison process, and then inspect sound quality. When external sound is captured by a microphone, the sound inspection cannot ensure reliability.

The above information disclosed in this Background section is only for understanding of the background of the inventive concepts, and, therefore, it may contain information that does not constitute prior art.

SUMMARY

Exemplary embodiments of the present invention provide a sound inspection method of a display device including a sound generator capable of detecting a sound without being affected by external noise.

Exemplary embodiments of the present invention also provide a sound inspection device of a display device including a sound generator capable of detecting a sound without being affected by external noise.

Additional features of the inventive concepts will be set forth in the description which follows, and in part will be apparent from the description, or may be learned by practice of the inventive concepts.

An exemplary embodiment of the present invention provides a sound inspection method of a display device including preparing a display device including a display panel and a sound generator disposed on a first surface of the display panel, placing a vibration sensor on a second surface opposite to the first surface of the display panel, vibrating the sound generator at a first reference frequency, vibrating the display panel, and then sensing a vibration of the vibration sensor that vibrates along with a vibration of the display panel, and determining whether a frequency of the vibration of the vibration sensor is included in a first threshold frequency region.

The first threshold frequency region may include a first representative threshold frequency, and the sound inspection method may further include determining that the display device is a good product when the frequency of the vibration of the vibration sensor is the same as the first representative threshold frequency, and determining that the display device is a defective product when the frequency of the vibration of the vibration sensor is different from the first representative threshold frequency.

The first representative threshold frequency may be the same as the first reference frequency of the sound generator.

The first threshold frequency region a range of frequencies that are greater than or equal to a first threshold frequency and less than or equal to a second threshold frequency higher than the first threshold frequency.

The first reference frequency of the sound generator may be greater than or equal to the first threshold frequency and less than or equal to the second threshold frequency.

The sound inspection method may further include determining that the display device is a good product when the frequency of the vibration of the vibration sensor is included in the first threshold frequency region, and determining that the display device is a defective product when the frequency of the vibration of the vibration sensor is not included in the first threshold frequency region.

The sound inspection method may further include comparing an amplitude of the vibration of the vibration sensor to a threshold amplitude when the frequency of the vibration of the vibration sensor is included in the first threshold frequency region.

The comparing of the amplitude of the vibration of the vibration sensor to the threshold amplitude may include determining that the display device is a good product when the amplitude of the vibration of the vibration sensor is greater than or equal to the threshold amplitude, and determining that the display device is a defective product when the amplitude of the vibration of the vibration sensor is smaller than the threshold amplitude.

The sound inspection method may further include comparing an amplitude of the vibration of the vibration sensor to a threshold amplitude before determining whether the frequency of the vibration of the vibration sensor is included in the first threshold frequency region.

The comparing of the amplitude of the vibration of the vibration sensor to the threshold amplitude may include: determining whether the frequency of the vibration of the vibration sensor is included in the first threshold frequency region when the amplitude of the vibration of the vibration sensor is greater than or equal to the threshold amplitude, and determining that the display device is a defective product when the amplitude of the vibration of the vibration sensor is smaller than the threshold amplitude.

The sound inspection method may further include determining that the display device is a good product when the frequency of the vibration of the vibration sensor is included in the first threshold frequency region; and determining that the display device is a defective product when the frequency of the vibration of the vibration sensor is not included in the first threshold frequency region.

The sound inspection method may further include vibrating the sound generator at a second reference frequency, vibrating the display panel, and sensing a second vibration of the vibration sensor that vibrates along with the vibration of the display panel when a frequency of a first vibration of the vibration sensor is included in the first threshold frequency region; and determining whether a frequency of the second vibration of the vibration sensor is included in a second threshold frequency region.

The sound inspection method may further include determining that the display device is a defective product when the frequency of the first vibration of the vibration sensor is not included in the first threshold frequency region; determining that the display device is a good product when the frequency of the second vibration of the vibration sensor is included in the second threshold frequency region; and determining that the display device is a defective product when the frequency of the second vibration of the vibration sensor is not included in the second threshold frequency region.

The second reference frequency may be different from the first reference frequency, the second threshold frequency region may range from a third threshold frequency different from a first threshold frequency to a fourth threshold frequency, which is different from a second threshold frequency and higher than the third threshold frequency, and the second reference frequency may be included in the second threshold frequency region.

The sound inspection method may further include removing the vibration of the vibration sensor included in a masking frequency region before determining whether the frequency of the vibration of the vibration sensor is included in a threshold frequency region.

The vibration of the vibration sensor may include vibration with a frequency A and vibration with a frequency B, and the removing of the vibration of the vibration sensor included in the masking frequency region may include removing vibration with a frequency which is one of the frequency A and the frequency B and which is included in the masking frequency region.

The vibration of the vibration sensor may include a plurality of vibrations, and the sound inspection method may further include determining that the display device is a defective product when the frequency of at least one of the plurality of vibrations is not included in the first threshold frequency region.

Another exemplary embodiment of the present invention provides a sound inspection device of a display device including a display panel and a sound generator disposed on a first surface of the display panel, the sound inspection device includes a support frame configured to support the display panel; a vibration sensor spaced apart from the support frame; a voltage sensing unit configured to sense a vibration of the vibration sensor; and a determination unit configured to compare a frequency of the vibration of the vibration sensor sensed by the voltage sensing unit to a threshold frequency region and determine whether the sound generator of the display device is a good product or a defective product.

The sound inspection device may further include a sound driving unit electrically connected to the sound generator and configured to apply a sound reference signal when the display panel is disposed on the support frame.

The vibration sensor may be disposed on a second surface of the display panel when the display panel is disposed on the support frame.

The vibration sensor may include a first vibration electrode and a second vibration electrode electrically insulated from each other; and a first vibration layer may be disposed between the first vibration electrode and the second vibration electrode.

The first vibration layer may contain a piezoelectric material or polyvinylidene fluoride (PVDF).

The sound generator may include a first electrode and a second electrode electrically insulated from each other; and a second vibration layer disposed between the first electrode and the second electrode, and the first vibration layer of the vibration sensor and the second vibration layer of the sound generator may contain the same material.

The voltage sensing unit may apply a first vibration driving voltage to the first vibration electrode, and the voltage sensing unit may sense a change in voltage of the second vibration electrode and output the voltage change to the determination unit.

The determination unit may calculate the frequency of the vibration of the vibration sensor according to the voltage change of the second vibration electrode, determine that the display device is a good product when the frequency of the vibration of the vibration sensor is included in the threshold frequency region, and determine that the display device is a defective product when the frequency of the vibration of the vibration sensor is not included in the threshold frequency region.

The determination unit may calculate an amplitude of the vibration of the vibration sensor according to a magnitude of the voltage of the second vibration electrode. The sound inspection device may further include a memory unit configured to store sound data corresponding to the amplitude of the vibration of the vibration sensor. The voltage sensing unit may deliver a sound data value corresponding to the amplitude of the vibration of the vibration sensor from the memory unit to the determination unit. The determination unit may compare the sound data delivered from the voltage sensing unit to a threshold sound data region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
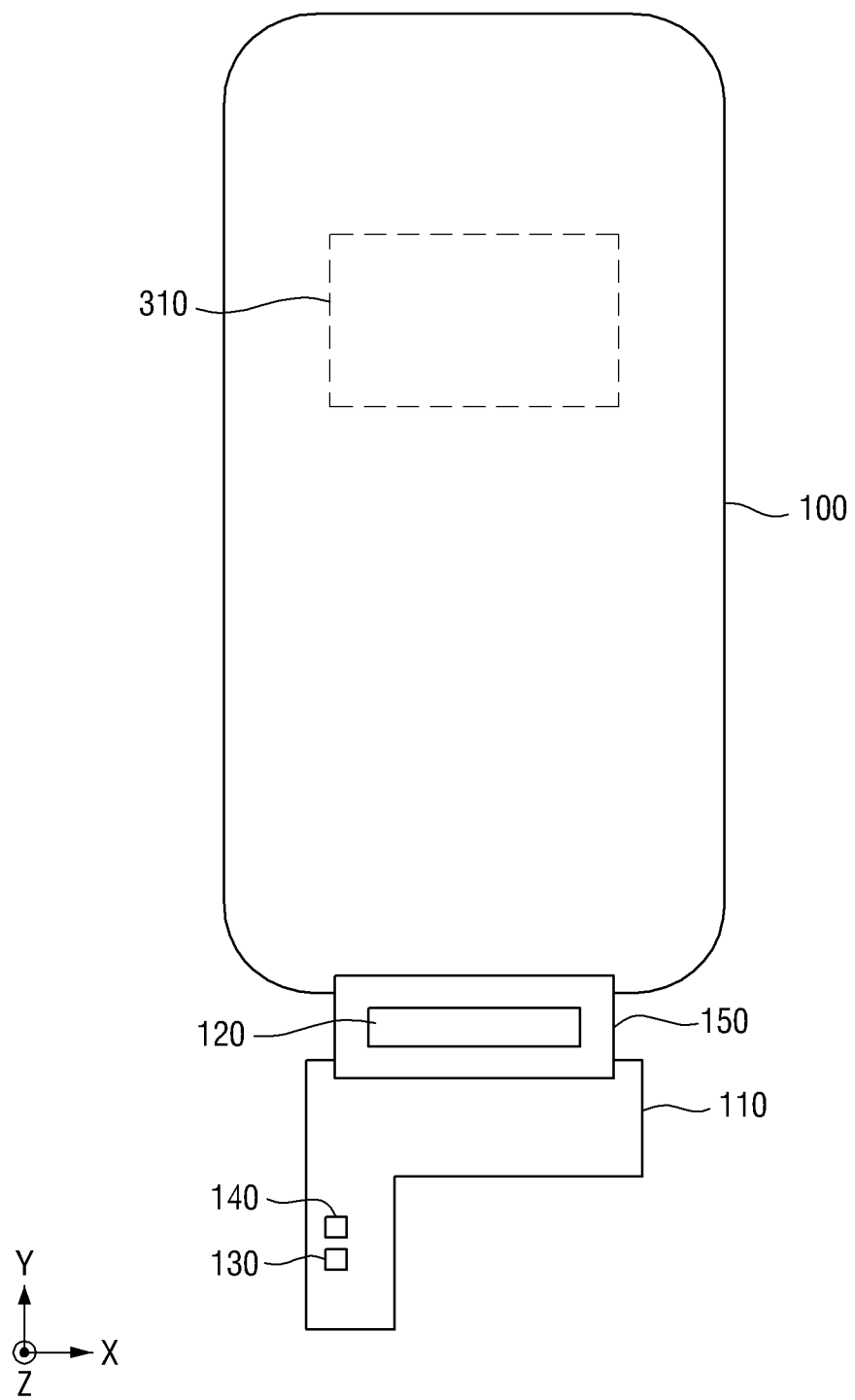
FIG. 1 is a plan view of a display device according to an exemplary embodiment of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
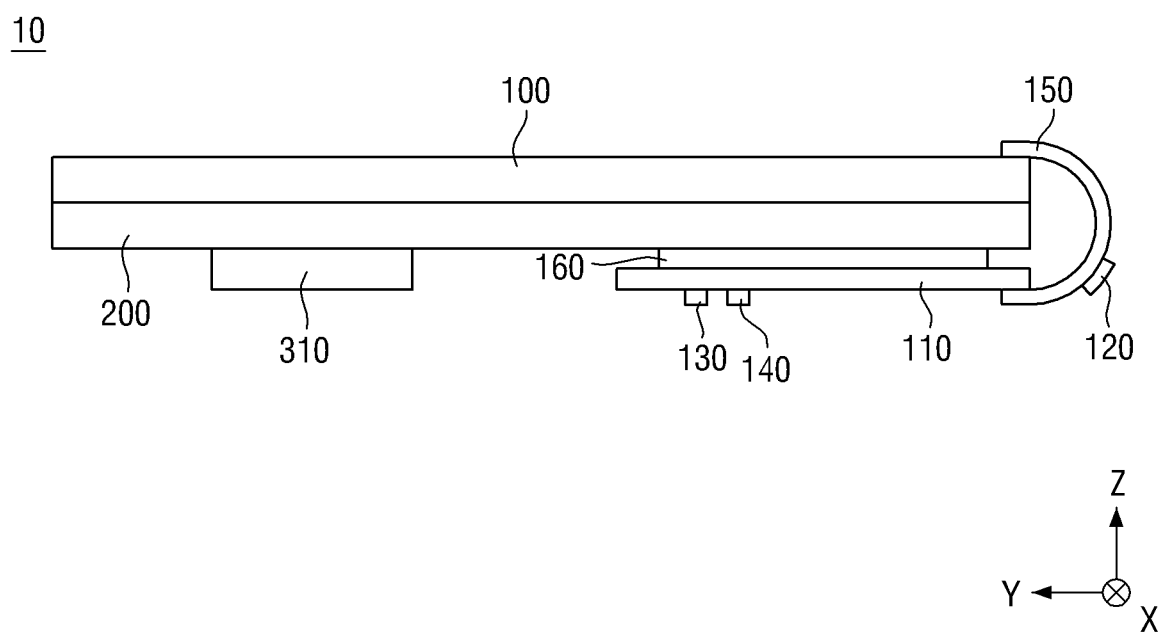
FIG. 2 is a side view illustrating an example of the display device of FIG. 1.

FIG. 1 is a plan view of a display device according to an exemplary embodiment. FIG. 2 is a side view illustrating an example of the display device of FIG. 1.

Referring to FIG. 1, a display device 10 according to an exemplary embodiment includes a display panel 100, a display circuit board 110, a display driving circuit 120, a flexible film 150, and a sound generator 310.

In the drawings, a first direction X, a second direction Y, and a third direction Z are defined. The first direction X and the second direction Y may be perpendicular to each other in one plane. The third direction Z may be perpendicular to the plane where the first direction X and the second direction Y are located. The third direction Z is perpendicular to the first direction X and the second direction Y. In exemplary embodiments, the third direction Z indicates the thickness direction of the display device 10.

Unless stated otherwise in the embodiments, the term "above" or "on top of" refers to the thickness direction of the display device 10 toward one side of the third direction Z. Likewise, the term "upper surface" refers to a surface facing one side of the third direction Z. Also, the term "below" or "on the bottom of" refers to the opposite direction to the thickness direction of the display device 10 toward the other side of the third direction Z, and the term "lower surface" refers to a surface facing the other side of the third direction Z. Also, the terms "left," "right," "upper," and "lower" refer to directions represented when the display device 10 is viewed from the top down. For example, the term "left" indicates the opposite direction to the X-axis direction, the term "right" indicates the X-axis direction, the term "upper" indicates the Y-axis direction, and the term "lower" indicates the opposite direction to the Y-axis direction.

The display device 10 may have a planar shape of a rectangle including long sides in the first direction X and short sides in the second direction Y. In the planar shape of the display device 10, a corner portion where one long side and one short side of the display device 10 meet each other may be bent at a right angle or rounded with a predetermined curvature. The planar shape of the display device 10 is not limited to the above example and may include a square, a circle, an ellipse, or other shapes.

The display panel 100 may have a substantially similar planar shape to the display device 10. For example, when the display device 10 has a planar shape of a rectangle, the display panel 100 may also have a rectangular shape similar to that of the display panel 100.

The display panel 100 may be a light emitting display panel including a light emitting element. For example, the display panel 100 may include an organic light emitting display panel using an organic light emitting diode including an organic light emitting layer, a micro light emitting diode display panel using a micro light emitting diode, a quantum dot light emitting display panel using a quantum dot light emitting element including a quantum dot light emitting layer, or an inorganic light emitting display panel using an inorganic light emitting element including an inorganic semiconductor.

The display circuit board 110 and the display driving circuit 120 may be attached to one side of the display panel 100. One end of the display circuit board 110 may be attached to pads provided on one side of the display panel 100 using an anisotropic conductive film. The display circuit board 110 may be a flexible printed circuit board that is bendable, a rigid printed circuit board that is hard and resists bending, or a hybrid printed circuit board including both of the rigid printed circuit board and the flexible printed circuit board.

The display driving circuit 120 receives controls signals and power voltages through the display circuit board 110 and generates and outputs signals and voltages for driving the display panel 100. The display driving circuit 120 may be formed as an integrated circuit and attached to a protrusion region of the display panel 100 by a chip-on-glass (COG) scheme, a chip-on-plastic (COP) scheme, or an ultrasonic scheme. However, the inventive concepts are not limited thereto, and the display driving circuit 120 may be attached to the display circuit board 110.

The touch driving circuit 130 may be disposed on the display circuit board 110. The touch driving circuit 130 may be formed as an integrated circuit board and attached to the upper surface of the display circuit board 110. The touch driving circuit 130 may be electrically connected to sensor electrodes of a sensor electrode layer of the display panel 100 through the display circuit board 110. The touch driving circuit 130 may determine whether a touch is made by a user by applying driving signals to driving electrodes among the sensor electrodes and then sensing, by means of sensing electrodes among the sensor electrodes, the amount of charge change in capacitance between the driving electrodes and the sensing electrodes. Here, the touch may include a contact touch and a proximity touch. The contact touch indicates that an object, such as the user's finger, is directly brought into contact with the upper surface of the display panel 100, and the proximity touch indicates that an object, such as a user's finger, is placed in close proximity to the upper surface of the display panel 100. The proximity touch may include hovering.

The sound driving circuit 140 may be disposed on the display circuit board 110. The sound driving circuit 140 receives sound data from a main processor. The sound driving circuit 140 generates sound driving voltages according to the sound data and outputs the generated sound driving voltages to the sound generator 310. The sound driving voltages may include a first driving voltage and a second driving voltage. The sound generator 310 may contract or expand depending on the first driving voltage and the second driving voltage and may output sounds by vibrating the display panel 100.

The sound driving circuit 140 may include a digital signal processor (DSP) configured to process the sound data, which is a digital signal, a digital-to-analog converter (DAC) configured to convert digital data processed by the digital signal processor into sound driving voltages, each of which is an analog signal, and an amplifier (AMP) configured to amplify and output the sound driving voltages.

A power supply circuit for supplying display driving voltages for driving the display driving circuit 120 may be disposed on the display circuit board 110. In this case, the display driving voltages for driving the display panel 100 and the sound driving voltages for driving the sound generator 310 may be generated and supplied by different circuits. Therefore, it is possible to prevent the display driving voltages for driving the display panel 100 from being affected by the sound driving voltages for driving the sound generator 310.

One side of the flexible film 150 may be attached to the upper surface of the display panel 100 from a lower side of the display panel 100 using an anisotropic conductive film. The other side of the flexible film 150 may be attached to the upper surface of the display circuit board 110 at an upper side of the display circuit board 110 using an anisotropic conductive film. The flexible film 150 may be a bendable film.

The sound generator 310 may be disposed below the display panel 100. The sound generator 310 may include a piezoelectric element or a piezoelectric actuator for vibrating the display panel 100 using a piezoelectric material that contracts or expands according to the voltage applied to the sound generator 310.

Referring to FIGS. 1 and 2, a lower panel cover 200 may be disposed below the display panel 100. The lower panel cover 200 may be attached to the lower surface of the display panel 100 through an adhesive member. The adhesive member may be a pressure sensitive adhesive (PSA).

The lower panel cover 200 may include at least one of a light absorbing member for absorbing light incident from the outside, a shock absorbing member for absorbing shock from the outside, and a heat dissipation member for efficiently dissipating heat from the display panel 100.

The light absorbing member may be disposed below the display panel 100. The light absorbing member prevents light transmission to prevent components disposed below the light absorbing member, for example, the display circuit board 110 and the sound generator 310, from being viewed from the top of the display panel 100. The light absorbing member may include a light absorption material, such as a black pigment or dye.

The shock absorbing member may be disposed below the light absorbing member. The shock absorbing member absorbs external shock and prevents the display panel 100 from being damaged. The shock absorbing member may be formed in a single layer or in a plurality of layers. For example, the short absorbing member may be formed of a polymer resin such as polyurethane, polycarbonate, polypropylene, and polyethylene or may contain an elastic material, such as rubber, a urethane-based material, and a sponge formed by foaming an acrylic material. The shock absorbing member may be a cushion layer.

The heat dissipation member may be disposed below the shock absorbing member. The heat dissipation member may be formed in a single layer or in a plurality of layers. For example, when the heat dissipation member is formed in a plurality of layers, the heat dissipation member may include a first heat dissipation layer containing graphite, carbon nanotubes, and the like and a second heat dissipation layer formed of a metal thin film, such as copper, nickel, ferrite, and silver that are excellent in thermal conductivity and that are capable of shielding electromagnetic waves.

The display circuit board 110 may be disposed on the lower panel cover 200. The display circuit board 110 may be bent by the flexible film 150 and disposed below the lower panel cover 200. The display circuit board 110 may have a first surface facing the lower panel cover 200 and a second surface opposite to the first surface. The display circuit board 110 may be attached and fastened to the lower panel cover 200 through the adhesive member 160 such as a pressure sensitive adhesive (PSA), but the inventive concepts are not limited thereto. For example, the display circuit board 110 may be fastened to the lower panel cover 200 through a fastening member, such as a screw.

One side of the flexible film 150 may be attached to one surface of the display panel 100 using an anisotropic conductive film. The other side of the flexible film 150 may be attached to the second surface of the display circuit board 110 using an anisotropic conductive film.

The sound generator 310 may be disposed below the lower panel cover 200. The sound generator 310 may be fastened or adhered to the lower surface of the lower panel cover 200 by means of an adhesive member, such as a pressure sensitive adhesive (PSA), or an anisotropic conductive adhesive member, such as an anisotropic conductive paste, and an anisotropic conductive film. However, the inventive concepts are not limited thereto, and the sound generator 310 may be fastened to the display circuit board 110. When the sound generator 310 is fastened to the lower panel cover 200, the display panel 100 may be vibrated in the thickness direction (Z-axis direction) of the display device 10 by the sound vibration apparatus 310.

Meanwhile, the lower panel cover 200 may be omitted. In this case, the components disposed on the lower surface of the lower panel cover 200, for example, the display circuit board 110 and/or the sound generator 310 may be disposed on the lower surface of the display panel 100 instead of the lower surface of the lower panel cover 200.

According to the exemplary embodiment shown in FIGS. 1 and 2, the sound generator 310 for vibrating the display panel 100 is disposed on the lower surface of the display panel 100 to output sounds. Thus, the sounds may be output by using the display panel 100 as a vibrating surface through the sound generator 310 that is not exposed to the outside. Therefore, a call receiver for outputting a partner's voice may be omitted from the front surface of the display device. Accordingly, a region where images are to be displayed by the display panel 100 may be widened.

Figure 3:
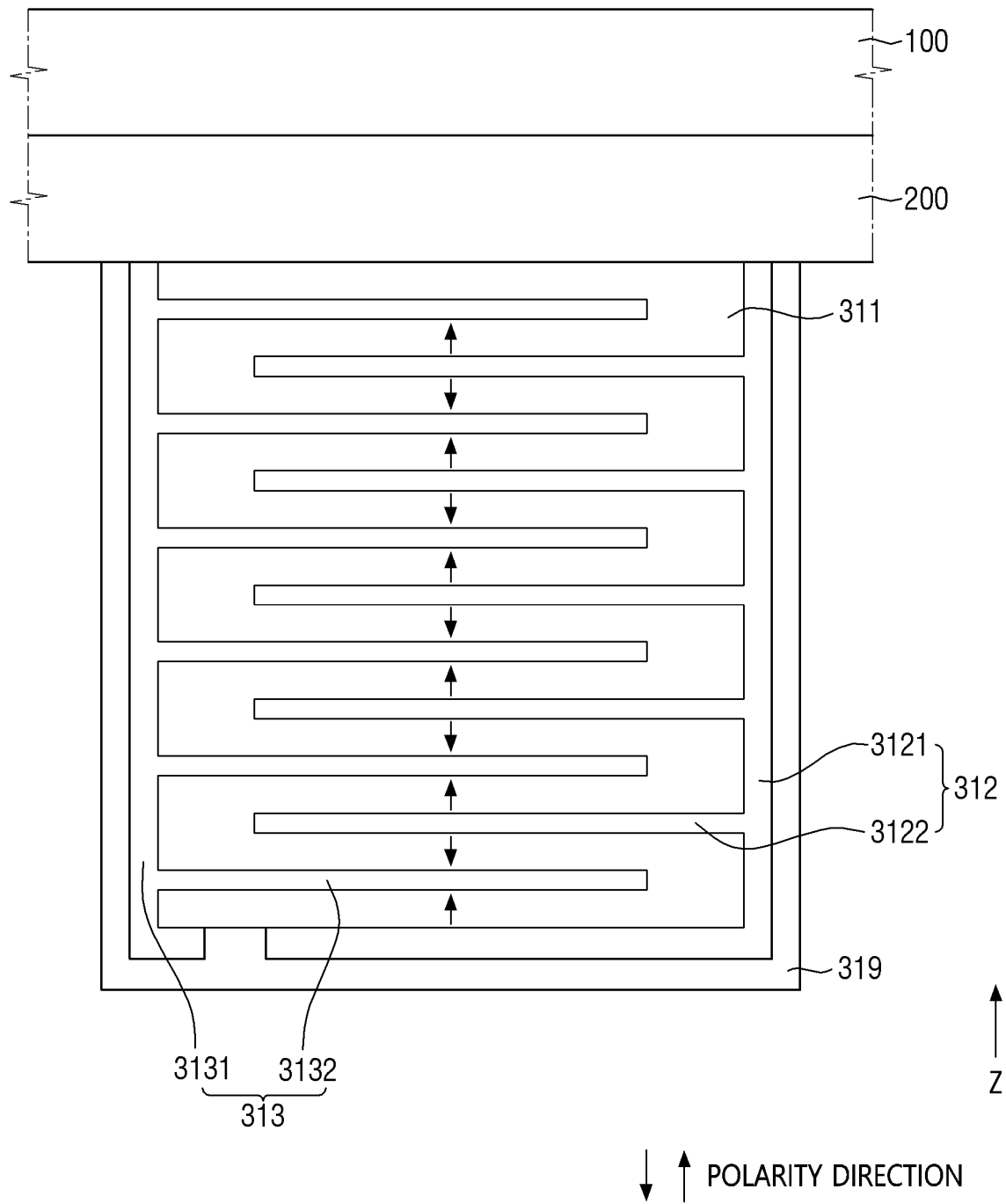
FIG. 3 is a sectional view showing an example of a sound generator.
Figure 4:
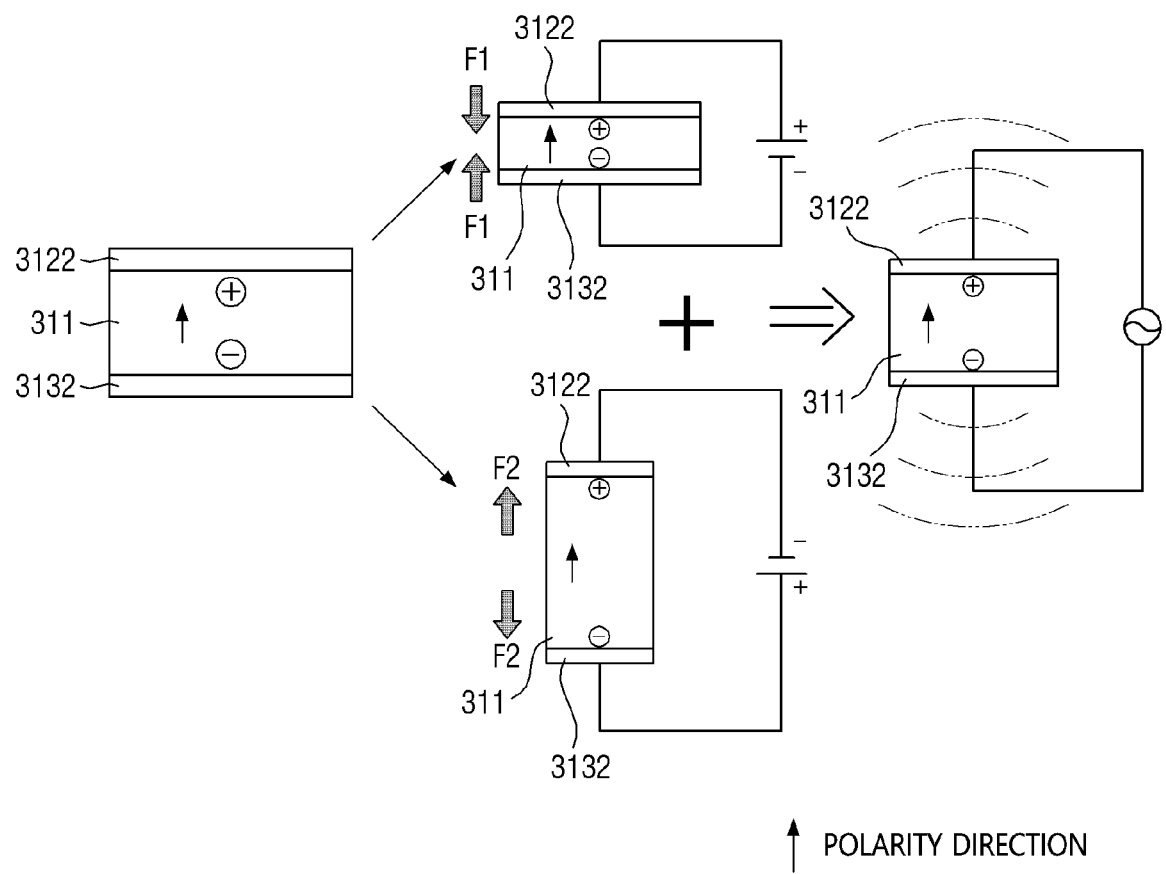
FIG. 4 is an example diagram showing a vibration method of a second vibration layer disposed between a first branch electrode and a second branch electrode of a sound generator.

FIG. 3 is a sectional view showing an example of a sound generator. FIG. 4 is an example diagram showing a vibration method of a second vibration layer disposed between a first branch electrode and a second branch electrode of a sound generator.

Referring to FIGS. 3 and 4, the sound generator 310 may be a piezoelectric element or piezoelectric actuator for vibrating the display panel 100 using a piezoelectric material that contracts or expands according to the voltage applied to the sound generator 310. The sound generator 310 may include a second vibration layer 311, a first electrode 312, and a second electrode 313.

The first electrode 312 may include a first stem electrode 3121 and first branch electrodes 3122. The first stem electrode 3121 may be disposed on at least one side surface of the second vibration layer 311, as shown in FIG. 3. Alternatively, the first stem electrode 3121 may be disposed to pass through a portion of the second vibration layer 311. The first stem electrode 3121 may be disposed on the upper surface of the second vibration layer 311. The first branch electrodes 3122 may be branched from the first stem electrode 3121. The first branch electrodes 3122 may be arranged parallel to each other.

The second electrode 313 may include a second stem electrode 3131 and second branch electrodes 3132. The second electrode 313 may be spaced apart from the first electrode 312. Thus, the second electrode 313 and the first electrode 312 may be electrically separated from each other. The second stem electrode 3131 may be disposed on at least one side surface of the second vibration layer 311. In this case, the first stem electrode 3121 may be disposed on the first side surface of the second vibration layer 311, and the second stem electrode 3131 may be disposed on the second side surface of the second vibration layer 311. Alternatively, the second stem electrode 3131 may be disposed to pass through a portion of the second vibration layer 311. The second stem electrode 3131 may be disposed on the upper surface of the second vibration layer 311. The second branch electrodes 3132 may be branched from the second stem electrode 3131. The second branch electrodes 3132 may be arranged parallel to each other.

The first branch electrodes 3122 and the second branch electrodes 3132 may be arranged parallel to each other in a horizontal direction (the X-axis direction or the Y-axis direction). Also, the first branch electrodes 3122 and the second branch electrodes 3132 may be alternately arranged in a vertical direction (the Z-axis direction). That is, the first branch electrodes 3122 and the second branch electrodes 3132 may be repeatedly arranged in the order of the first branch electrode 3122, the second branch electrode 3132, the first branch electrode 3122, and the second branch electrode 3132 in the vertical direction (the Z-axis direction).

The second vibration layer 311 may be a piezoelectric element that is deformable according to a driving voltage applied to the first electrode 312 and a driving voltage applied to the second electrode 313. In this case, the second vibration layer 311 may be any one of a polyvinylidene fluoride (PVDF) film, piezoelectric materials, such as plumbum zirconate titanate (PZT), and electroactive polymers.

Since the second vibration layer 311 has a high manufacturing temperature, the first electrode 312 and the second electrode 313 may be formed of silver (Ag) having a high melting point or an alloy of silver (Ag) and palladium (Pd). In order to increase the melting points of the first electrode 312 and the second electrode 313, when the first electrode 312 and the second electrode 313 are formed of an alloy of silver (Ag) and palladium (Pd), the content of silver (Ag) may be higher than the content of palladium (Pd).

The second vibration layer 311 may be disposed between the first branch electrodes 3122 and the second branch electrodes 3132. The second vibration layer 311 may contract or expand according to the difference between the driving voltage applied to the first branch electrodes 3122 and the driving voltage applied to the second branch electrodes 3132.

In detail, as shown in FIG. 4, when the polarity direction of the second vibration layer 311 disposed between the first branch electrode 3122 and the second branch electrode 3132 disposed below the first branch electrode 3122 is an upward direction (↑), the second vibration layer 311 may have a positive polarity in an upper region adjacent to the first branch electrode 3122 and may have a negative polarity in a lower region adjacent to the second branch electrode 3132. Also, when the polarity direction of the second vibration layer 311 disposed between the second branch electrode 3132 and the first branch electrode 3122 disposed below the second branch electrode 3132 is a downward direction (↓), the second vibration layer 311 may have a negative polarity in an upper region adjacent to the second branch electrode 3132 and may have a positive polarity in a lower region adjacent to the first branch electrode 3122. The polarity direction of the second vibration layer 311 may be determined by a process in which an electric field is applied to the second vibration layer 311 using the first branch electrode 3122 and the second branch electrode 3132.

As shown in FIG. 4, it is assumed that the polarity direction of the second vibration layer 311 disposed between the first branch electrode 3122 and the second branch electrode 3132 disposed below the first branch electrode 3122 is an upward direction (↑). When a driving voltage having a positive polarity is applied to the first branch electrode 3122 and a driving voltage having a negative polarity is applied to the second branch electrode 3132, the second vibration layer 311 may contract according to a first force F1. The first force F1 may be a contractive force. Also, when a driving force having a negative polarity is applied to the first branch electrode 3122 and a driving force having a positive polarity is applied to the second branch electrode 3132, the second vibration layer 311 may expand according to a second force F2. The second force F2 may be an expansion force.

Similarly, it is assumed that the polarity direction of the second vibration layer 311 disposed between the second branch electrode 3132 and the first branch electrode 3122 disposed below the second branch electrode 3132 is a downward direction (↓). When a driving voltage having a positive polarity is applied to the second branch electrode 3132 and a driving voltage having a negative polarity is applied to the first branch electrode 3122, the second vibration layer 311 may expand according to the expansion force. Also, when a driving force having a negative polarity is applied to the second branch electrode 3132 and a driving force having a positive polarity is applied to the first branch electrode 3122, the second vibration layer 311 may contract according to the contractive force.

When the driving voltages applied to the first electrode 312 and the driving voltage applied to the second electrode 313 alternately and repeatedly have a positive polarity and a negative polarity, the second vibration layer 311 repeatedly contracts and expands. Thus, the sound generator 310 vibrates. The sound generator 310 is disposed on one surface of the lower panel cover 200. Accordingly, when the second vibration layer 211 of the sound generator 310 contracts and expands, the display panel 100 disposed on one surface of the lower panel cover 200 vibrates due to stress in the third direction Z, which is the thickness direction of the display device 10.

A protective layer 319 may be further disclosed on the second surface and side surfaces of the sound generator 310. That is, the protective layer 319 may be disposed on the first electrode 312, the second electrode 313, and the second vibration layer 311 that is exposed and is not covered by the first electrode 312 and the second electrode 313 but exposed. The protective layer 319 may be disposed to surround the first electrode 312, the second electrode 313, and the second vibration layer 311 that is exposed and is not covered by the first electrode 312 and the second electrode 313. Therefore, the second vibration layer 311, the first electrode 312, and the second electrode 313 of the sound generator 310 may be protected by the protective layer 319. The protective layer 319 may be formed of an insulating material such as ceramic.

Figure 5:
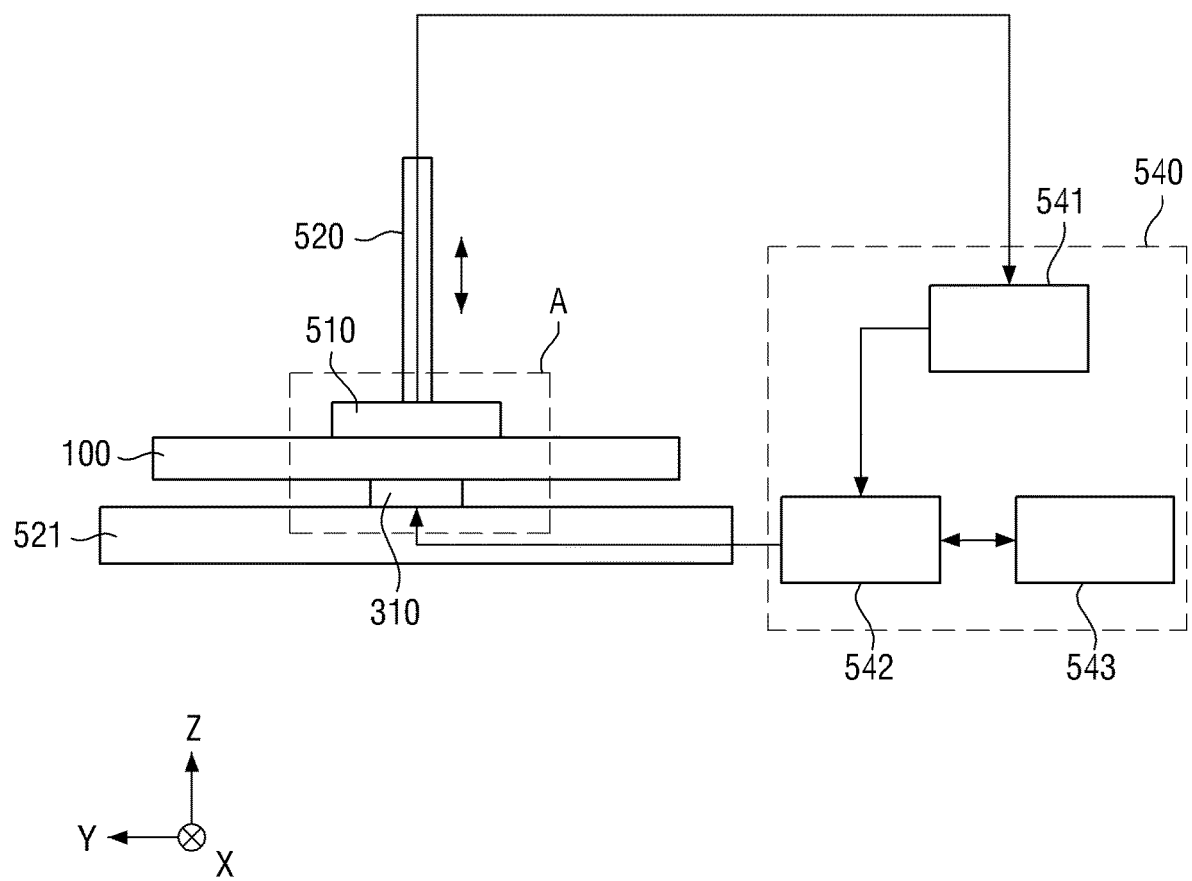
FIG. 5 is a side view schematically showing a sound inspection device according to an exemplary embodiment of the present invention.
Figure 6:
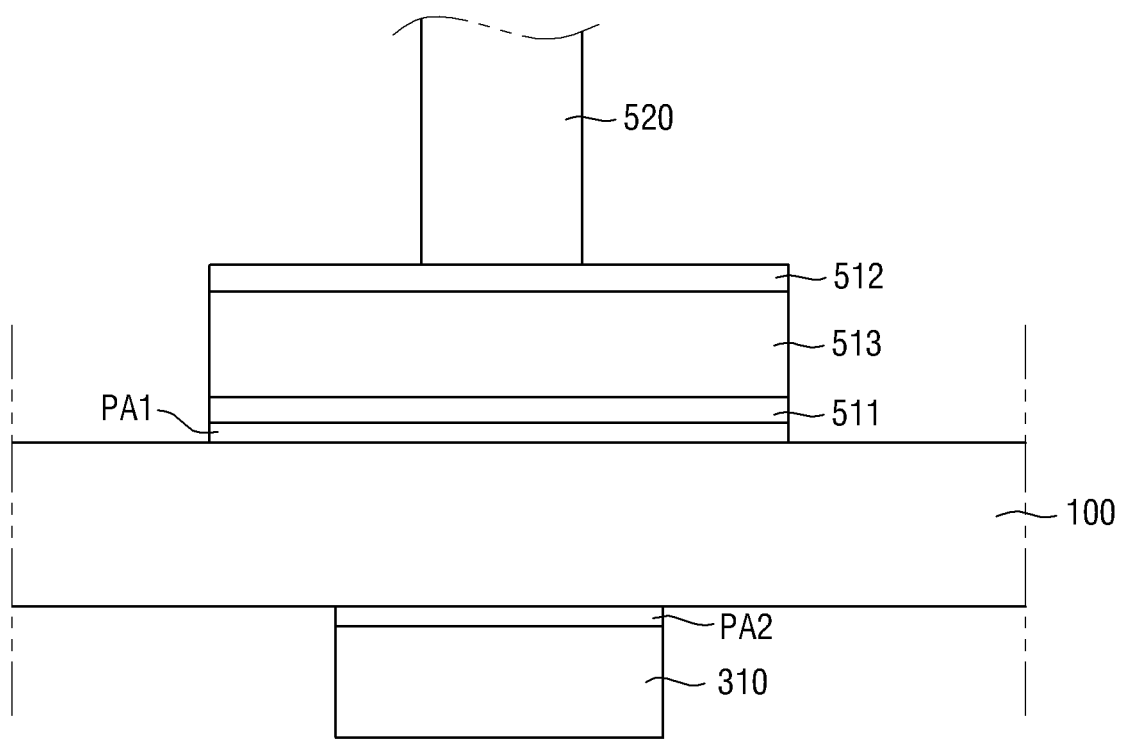
FIG. 6 is an enlarged view of region A of FIG. 5.

FIG. 5 is a side view schematically showing a sound inspection device according to an exemplary embodiment. FIG. 6 is an enlarged view showing an example of region A of FIG. 5.

Referring to FIGS. 5 and 6, a sound inspection device 500 according to an exemplary embodiment may include a vibration sensor 510, a support frame 521, and a vibration sensing unit 540. The vibration sensing unit 540 may include a sound driving unit 541, a voltage sensing unit 542, and a determination unit 543.

The support frame 521 supports the first surface of the display panel 100 housed in the sound inspection device 500 in order to inspect sounds of the sound generator 310. In FIG. 5, the support frame 521 is illustrated as being disposed to support the entirety of the first surface of the display panel 100, but the inventive concepts are not limited thereto. In order to not disturb the sound generator 310 vibrating in the thickness direction (the Z-axis direction) of the display device 10, the support frame 521 may be formed such that the support frame 521 is not overlapped with the sound generator 310. For example, the support frame 521 may be formed to support the edge of the display panel, like a rectangular frame. Alternatively, the support frame 521 may be formed to support at least two of the four sides of the display panel 100. The support frame 521 may be formed of plastic, but the inventive concepts are not limited thereto.

As shown in FIG. 6, the vibration sensor 510 may include a first vibration electrode 511, a second vibration electrode 512, and a first vibration layer 513.

The first vibration electrode 511 may be disposed on one surface of the first vibration layer 513, and the second vibration electrode 512 may be disposed on the other surface opposite to the one surface of the first vibration layer 513. The first vibration electrode 511 may be entirely disposed on the one surface of the first vibration layer 513, and the second vibration electrode 512 may be entirely disposed on the other surface of the first vibration layer 513. The first vibration layer 513 may be disposed between the first vibration electrode 511 and the second vibration electrode 512. The first vibration electrode 511 and the second vibration electrode 512, which are spaced apart from each other, may be electrically insulated from each other.

Each of the first vibration electrode 511 and the second vibration electrode 512 may be formed of an opaque metallic material or a transparent conductive oxide. The first vibration layer 513 may be formed of PVDF or PZT. When a first vibration driving voltage is applied to the first vibration electrode 511, the first vibration layer 513 of the vibration sensor 510 may vibrate due to a vibration of the display panel, and the vibration of the first vibration layer 513 may generate a voltage in the second vibration electrode 512. The vibration sensor 510 may sense a change in voltage of the second vibration electrode.

The vibration sensor 510 may be moved by a vibration sensor support 520 and attached to a predetermined region of the display panel 100. The vibration sensor support 520 stores coordinates corresponding to the predetermined region of the display panel 100. When the display device 10 is mounted on the support frame 521, the vibration sensor support 520 may move to the predetermined coordinates and may attach the vibration sensor 510 to the second surface of the display panel 100. The second surface of the display panel 100 may be opposite to the first surface of the display panel 100 where the sound generator 310 is to be disposed. On the second surface of the display panel 100, the predetermined coordinates of the display panel 100 may be an X coordinate indicating the location of the display panel 100 in a short-side direction (the X-axis direction) and a Y coordinate indicating the location of the display panel 100 in a long-side direction (the Y-axis direction).

The vibration sensor 510 may be attached to the second surface of the display panel 100 such that the vibration sensor 510 is overlapped with the sound generator 310 in the thickness direction of the display device 10. In order to match a vibration sensed by the vibration sensor 510 with the vibration of the sound generator 310, the vibration sensor 510 may be completely overlapped with the sound generator 310 in the thickness direction of the display device 10. For example, the length of the vibration sensor 510 in the first direction X is greater than the length of the sound generator 310 in the first direction X, and the length of the vibration sensor 510 in the second direction Y is greater than the length of the sound generator 310 in the second direction Y.

The vibration sensor 510 may be attached to the display panel 100 by means of a first adhesive layer PA1. The first adhesive layer PA1 may be disposed between the vibration sensor 510 and the display panel 100. The first adhesive layer PA1 may be disposed to cover at least a portion of the second surface of the display panel 100 and the first surface of the vibration sensor 510.

The sound generator 310 may be attached to and fastened to the display panel 100 by means of a second adhesive layer PA2. The second adhesive layer PA2 may be disposed between the sound generator 310 and the display panel 100. The second adhesive layer PA2 may be disposed to cover at least a portion of the second surface of the sound generator 510 and the first surface of the display panel 100. Each of the first adhesive layer PA1 and the second adhesive layer PA2 may be a pressure sensitive adhesive (PSA).

The second adhesive layer PA2 may have greater adhesion strength than the first adhesive layer PA1. That is, the adhesive strength at which the sound generator 310 is fastened to the display panel 100 may be greater than the adhesive strength at which the vibration sensor 510 is attached to the display panel 100. Accordingly, after the sound inspection of the sound inspection device 500 is finished, the vibration sensor 510 may be detached from the second surface of the display panel 100, and the sound generator 310 may be attached to the first surface of the display panel 100. By setting the adhesive strength of the second adhesive layer PA2 to be greater than the adhesive strength of the first adhesive layer PA1, the vibration sensor 510 may be easily detached from the second surface of the display panel 100 after the sound inspection is finished.

The vibration sensing unit 540 may include a sound driving unit 541, a voltage sensing unit 542, and a determination unit 543. The vibration sensing unit 540 may be formed as an integrated circuit.

When the display device 10 is mounted on the support frame 521 and the vibration sensor 510 is attached to the second surface of the display panel 100, the sound driving unit 541 applies a sound reference signal to the sound generator 310. The sound reference signal includes the first driving voltage applied to the first electrode 312 of the sound generator 310 shown in FIGS. 3 and 4 and the second driving voltage applied to the second electrode 313. Each of the first driving voltage and the second driving voltage may be applied in the form of an alternating current (AC) voltage according to a first reference frequency. The second vibration layer 311 of the sound generator 310 may contract or expand according to the first driving voltage and the second driving voltage, and thus, the display panel 100 may vibrate in the thickness direction of the display device 10. Accordingly, sounds may be output by using the display panel as a vibration surface.

When the display device 10 is mounted on the support frame 521 and the vibration sensor 510 is attached to the second surface of the display panel, the voltage sensing unit 542 may apply a first vibration driving voltage to the first vibration electrode 512 of the vibration sensor 510 and may sense the voltage of the second vibration electrode 513 generated by the piezoelectric effect of the first vibration layer 511 due to the vibration of the display panel 100. The voltage sensing unit 542 may include an analog-to-digital converter and thus, may convert the voltage of the second vibration electrode 513 into sensing voltage data VD, which is digital data. The voltage sensing unit 542 may output the sensing voltage data VD to the determination unit 543.

The determination unit 543 may analyze the sensing voltage data VD and calculate the frequency of the vibration of the vibration sensor 510. For example, the determination unit 543 may calculate a voltage change period of the sensing voltage data VD and may calculate the frequency of the vibration of the vibration sensor 510 on the basis of the calculated voltage change period. Also, the determination unit 543 may analyze the sensing voltage data VD and calculate the amplitude of the vibration of the vibration sensor 510. For example, the determination unit 543 may calculate the amplitude of the vibration of the vibration sensor 510 according the size of the sensing voltage data VD. For example, the determination unit 543 may receive a change in voltage of the second vibration electrode 513 of the vibration sensor 510 output by the voltage sensing unit 542; calculate the frequency of the vibration sensor 510 through the change in voltage; and calculate the amplitude of the vibration sensor 510 on the basis of the magnitude of voltage.

The determination unit 543 may compare the calculated frequency of the vibration of the vibration sensor 510 to a predetermined threshold frequency region; compare the amplitude of the vibration of the vibration sensor 510 to a predetermined threshold amplitude; and determine whether the sound generator 310 of the display device 10 is a viable product or a defective product. Exemplary embodiments of the method of the determination unit 543 determining a good product and a defective product will be described in detail in conjunction with FIGS. 7 to 16.

Figure 7:
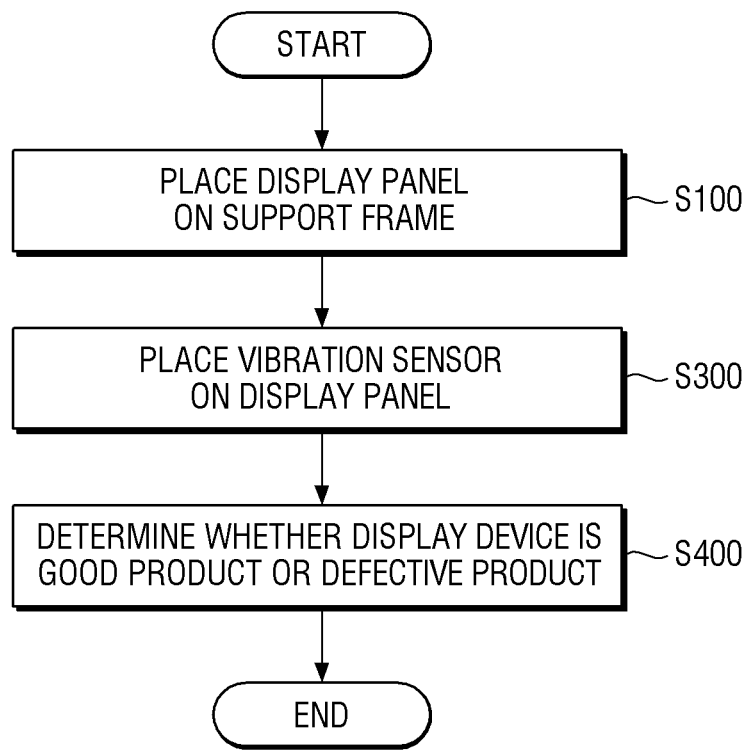
FIG. 7 is a flowchart showing a method of driving a sound inspection device according to an exemplary embodiment of the present invention.

FIG. 7 is a flowchart showing a method of driving a sound inspection device according to an exemplary embodiment.

A sound inspection method of the display device 10 using the sound inspection device 500 according to an exemplary embodiment will be described below with reference to FIGS. 6 and 7.

First, the display panel 100 is disposed on the support frame 521 of the sound inspection device 500 to perform a sound inspection on the display device 10. For example, the display panel 100 may be disposed on the support frame 521 such that the first surface of the display panel where the sound generator 310 is to be disposed is supported by the support frame 521 (S100 in FIG. 1).

Second, the vibration sensor 510 is disposed on the second surface of the display panel 100 (S300 in FIG. 7).

The vibration sensor 510 may be moved by the vibration sensor support 520. The vibration sensor support 520 stores coordinates corresponding to a predetermined region of the display panel 100 and moves to the stored coordinates. The coordinates corresponding to the predetermined region of the display panel 100 may be coordinates of a region of the first surface of the display panel 100 where the sound generator 310 is to be disposed. Accordingly, the vibration sensor 510 may be overlapped with the sound generator 310 disposed on the first surface of the display panel 100 in the thickness direction of the display device 10. The vibration sensor 510 may be disposed at the stored coordinates on the second surface of the display panel 100.

Third, the vibration sensing unit 540 applies a sound reference signal to the sound generator 310 of the display device 10; senses the vibration of the sound generator 310; and then determines whether the sound generator 310 is a good product or a defective product (S400).

Embodiments of S400 will be described in detail in conjunction with FIGS. 8, 10, 11, 13, and 15.

Figure 8:
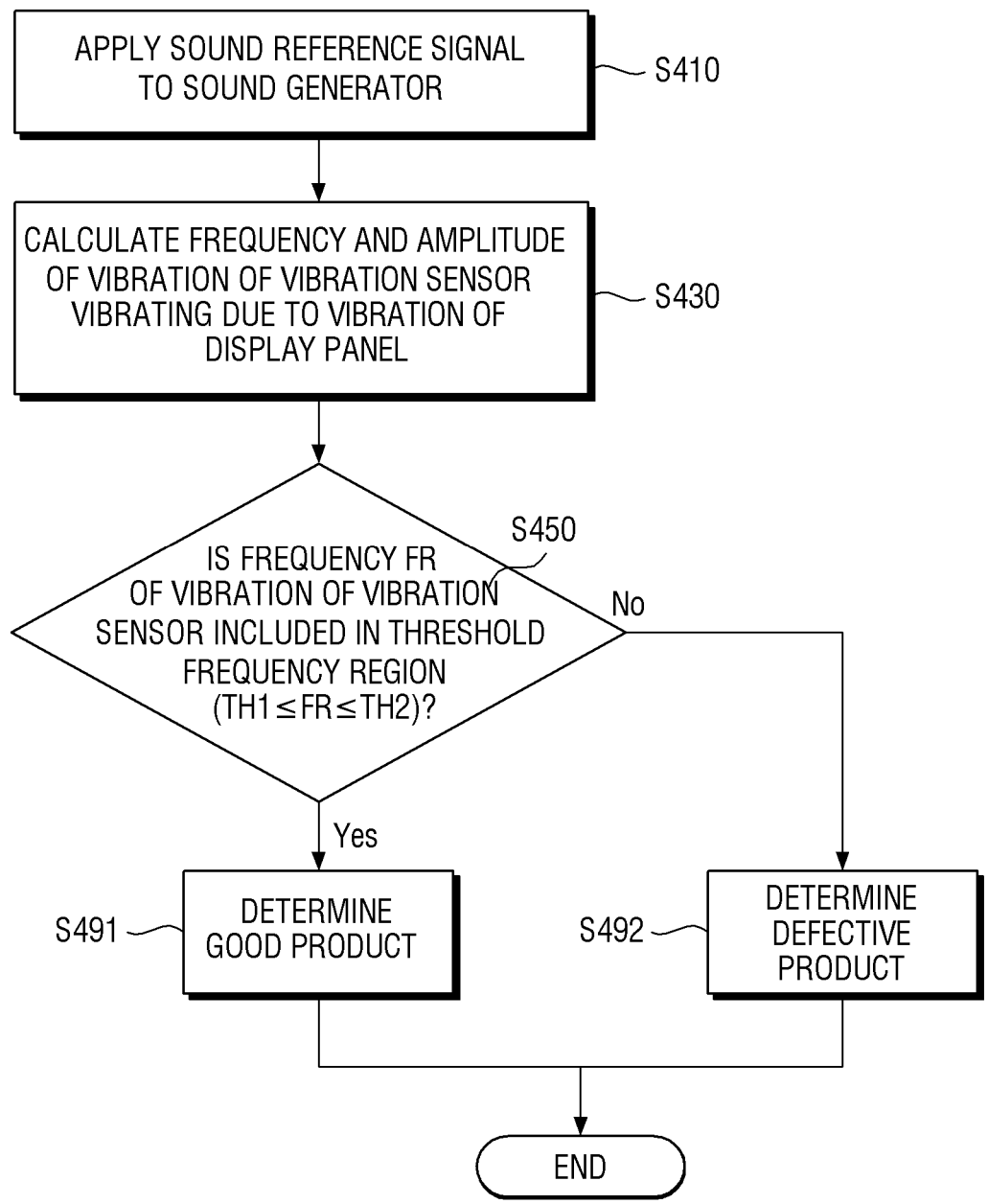
FIG. 8 is a flowchart showing an example of S400 in FIG. 7 in detail.
Figure 9:
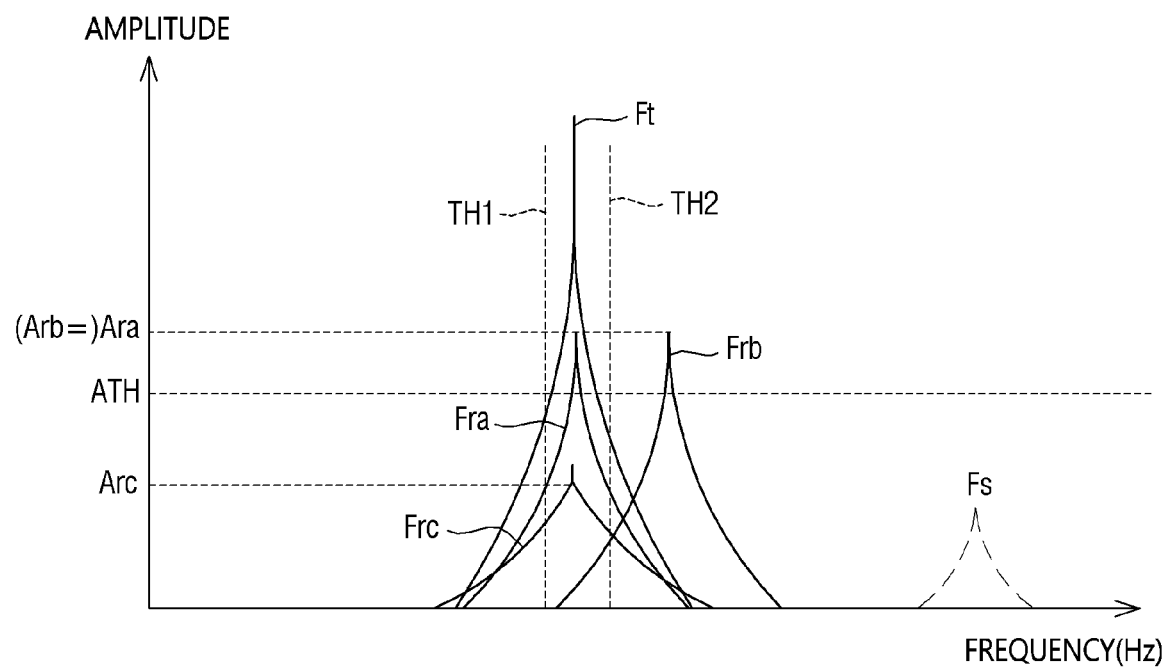
FIG. 9 is a graph showing an example of the frequency and amplitude of a vibration sensed by a vibration sensor and the frequency and amplitude of a sound reference signal applied to the sound generator of FIG. 7.

FIG. 8 is a flowchart showing an example of S400 in FIG. 7 in detail. FIG. 9 is a graph showing an example of the frequency and amplitude of a vibration sensed by a vibration sensor and the frequency and amplitude of a sound reference signal applied to the sound generator of FIG. 7.

Referring to FIGS. 8 and 9, first, a sound reference signal is applied to the sound generator 310 (S410 in FIG. 8).

After the display panel 100 is disposed on the support frame 521, the sound generator 310 may be electrically connected to the sound driving unit 541 of the vibration sensing unit 540. The sound driving unit 541 may apply the sound reference signal to the sound generator 310. The sound reference signal applied to the sound generator 310 may include a first driving voltage and a second driving voltage. Each of the first driving voltage and the second driving voltage may be applied to the sound generator 310 in the form of an AC voltage according to a first reference frequency Ft. When the sound reference signal is applied to the sound generator 310, the second vibration layer 311 of the sound generator 310 may repeatedly contract and expand in the thickness direction of the display panel 100. Thus, the sound generator 310 may vibrate with the first reference frequency Ft in the thickness direction of the sound generator 310. Also, the display panel 100 may vibrate with the first reference frequency Ft in the thickness direction of the display panel 100 according to the vibration of the sound generator 310.

In FIGS. 8 and 9, the sound reference signal is illustrated as being applied so that the sound generator 310 vibrates with one frequency, that is, the first reference frequency Ft, but the inventive concepts are not limited thereto. The sound reference signal may be applied so that the sound generator 310 vibrates with a plurality of frequencies. Second, the frequency Fr and amplitude Ar of the vibration of the vibration sensor 510 vibrating along with the vibration of the display panel 100 are calculated (S430 in FIG. 8).

When the vibration sensor 510 is attached to the second surface of the display panel 100, the voltage sensing unit 542 may apply a first vibration driving voltage to the first vibration electrode 512 of the vibration sensor 510. Also, the voltage sensing unit 542 may sense the voltage of the second vibration electrode 513 generated by the piezoelectric effect of the first vibration layer 511 of the vibration sensor 510 due to the vibration of the display panel 100. An analog-to-digital converter of the voltage sensing unit 542 may convert the voltage of the second vibration electrode 513 into sensing voltage data VD, which is digital data. The voltage sensing unit 542 may output the sensing voltage data VD to the determination unit 543.

The determination unit 543 may analyze the sensing voltage data VD and calculate the frequency Fr and amplitude Ar of the vibration of the vibration sensor 510. As described above, the determination unit 543 may analyze the sensing voltage data VD to calculate the voltage magnitude and the voltage change period of the sensing voltage data VD and may analyze the calculated voltage magnitude and voltage change period to calculate the frequency Fr and amplitude Ar of the vibration of the vibration sensor 510. The method of calculating the frequency Fr and the amplitude Ar of the vibration of the vibration sensor 510 is not limited thereto.

Third, it is determined whether the frequency Fr of the vibration of the vibration sensor 510 is included in a first threshold frequency region (S450 in FIG. 8).

The determination unit 543 may compare the calculated frequency Fr of the vibration of the vibration sensor 510 to the predetermined first threshold frequency region. The first threshold frequency region is a range of frequencies that may be greater than or equal to a first threshold frequency TH1 and may be less than or equal to a second threshold frequency TH2 higher than the first threshold frequency TH1. The first threshold frequency region may include a first reference frequency Ft. That is, the first reference frequency Ft may be greater than or equal to the first threshold frequency and less than or equal to the second threshold frequency TH2.

As shown in FIG. 9, when the frequency Fr of the vibration of the vibration sensor 510 is frequency "a" Fra, the determination unit 543 determines whether frequency "a" Fra is included in the first threshold frequency region. Since frequency "a" Fra is greater than or equal to the first threshold frequency TH1 and less than or equal to the second threshold frequency TH2, the determination unit 543 may determine that frequency "a" Fra is included in the first threshold frequency region.

Also, as shown in FIG. 9, when the frequency Fr of the vibration of the vibration sensor 510 is frequency "b" Frb, the determination unit 543 determines whether frequency "b" Frb is included in the first threshold frequency region. Since frequency "b" Frb is greater than the second threshold frequency TH2, the determination unit 543 may determine that frequency "b" Frb is not included in the first threshold frequency region.

Fourth, when it is determined that the frequency Fr of the vibration of the vibration sensor 510 is included in the first threshold frequency region, the determination unit 543 determines that the display device 10 is a good product (S491 in FIG. 8).

For example, as shown in FIG. 9, when the frequency Fr of the vibration of the vibration sensor 510 is frequency "a" Fra, the determination unit 543 determines that the display device 10 is a good product because frequency "a" Fra is included in the first threshold frequency region.

Fifth, when it is determined that the frequency Fr of the vibration of the vibration sensor 510 is not present in the first threshold frequency region, the determination unit 543 determines that the display device 10 is a defective product (S491 in FIG. 8).

For example, as shown in FIG. 9, when the frequency Fr of the vibration of the vibration sensor 510 is frequency "b" Frb, the determination unit 543 may determine that the display device 10 is a defective product because frequency "b" Frb is not included in the first threshold frequency region.

The first threshold frequency region may be set as a first representative threshold frequency Ft. The first representative threshold frequency Ft is the same as the first reference frequency Ft. When it is determined that the frequency Fr of the vibration of the vibration sensor 510 is the same as the first representative threshold frequency Ft, the determination unit 543 may determine that the display device 10 is a good product. Also, when it is determined that the frequency Fr of the vibration of the vibration sensor 510 is different from the first representative threshold frequency Ft, the determination unit 543 may determine that the display device 10 is a defective product.

According to the exemplary embodiment shown in FIGS. 8 and 9, the sound inspection device 500 determines whether the frequency Fr of the vibration of the vibration sensor 510 for sensing the vibration of the display panel 100 is matched with the frequency of the sound reference signal of the sound generator 310, senses sounds output by the sound generator in the form of a vibration, and then inspects the vibration. Accordingly, since the sound inspection device 500 inspects whether the sound generator 310 is a good product by the vibration sensor 510 sensing the vibration of the display panel 100 that is vibrating along with the vibration of the sound generator 310, noise generated in the inspection environment may not be sensed by the vibration sensor 510. Thus, it is possible to prevent noise generated in an inspection environment from affecting a sound inspection compared to a case of sensing sounds output due to the vibration of the display panel 100 caused by the sound generator 310 by means of a microphone and inspecting the sounds output by the sound generator 310. Also, there is no need to install a sound shielding member or a sound absorbing member in the sound inspection device so that noise is prevented from affecting a sound inspection, and thus it is possible to reduce costs.

Figure 10:
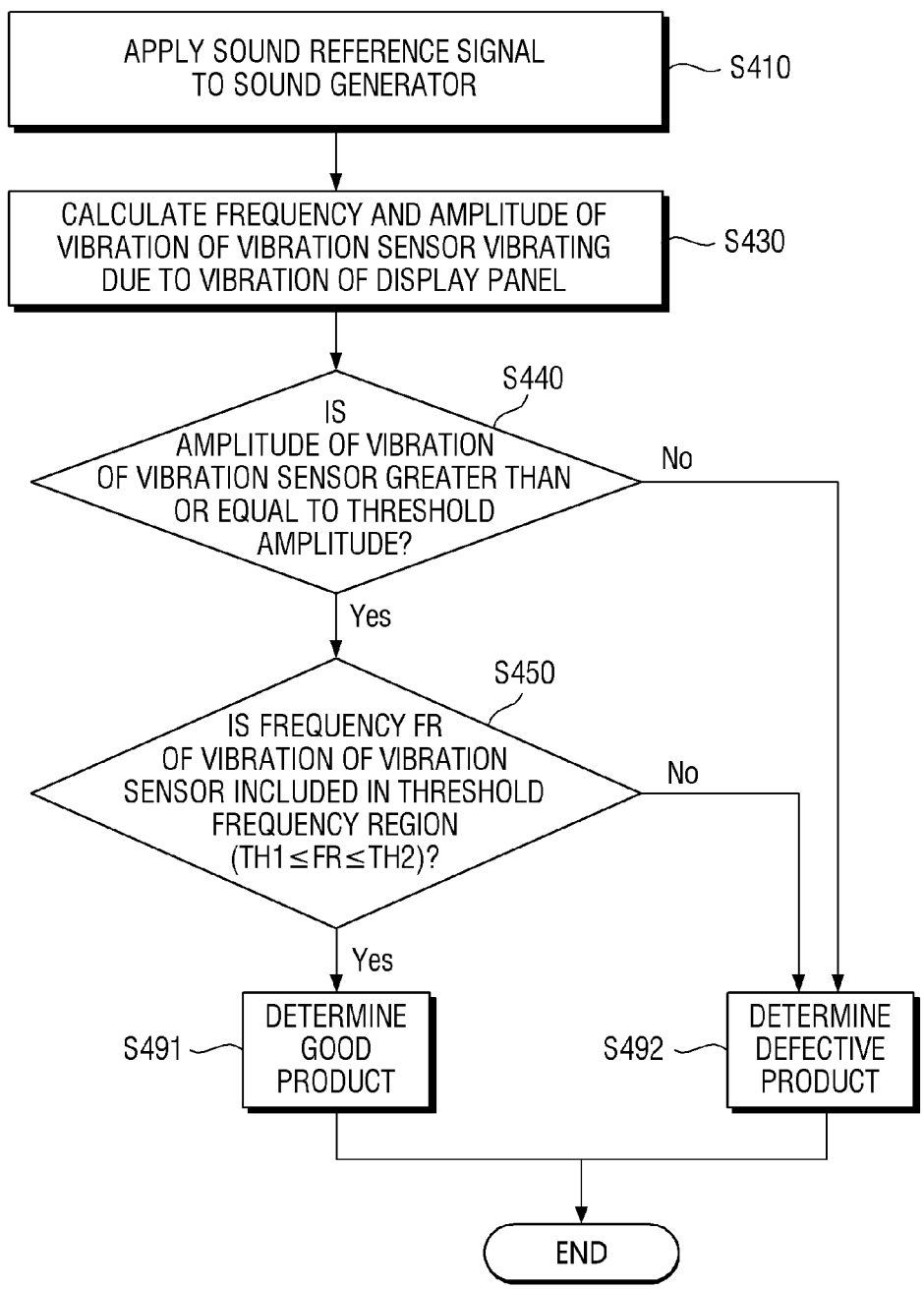
FIG. 10 is a flowchart showing another example of S400 in FIG. 7 in detail.

FIG. 10 is a flowchart showing another example of S400 in FIG. 7 in detail.

The exemplary embodiment shown in FIG. 10 is different from the exemplary embodiment shown in FIG. 8 in that an operation of determining the amplitude of the vibration of the vibration sensor (S440) is additionally included, which would be performed between S430 and S450. In the following description with reference to FIG. 10, the parts that have been described with reference to the exemplary embodiment shown in FIG. 8 will be omitted.

Referring to FIGS. 6, 9, and 10, the sound inspection method of the display device according to an exemplary embodiment may include an operation of determining whether the amplitude of the vibration of the vibration sensor 510 is greater than or equal to a threshold amplitude ATH (S440), which would be performed between S430 and S450.

The determination unit 543 may compare the calculated amplitude Ar of the vibration of the vibration sensor 510 to the predetermined threshold amplitude ATH. The threshold amplitude ATH may be smaller than the amplitude of the sound reference signal. For example, the threshold amplitude ATH may be smaller than the amplitude of the first driving voltage of the sound reference signal. Also, the threshold amplitude ATH may be smaller than or equal to the amplitude of the second driving voltage of the sound reference signal.

When it is determined that the amplitude Ar of the vibration of the vibration sensor 510 is greater than or equal to the threshold amplitude ATH, the determination unit 543 may determine whether the frequency Fr of the vibration of the vibration sensor 510 is included in the first threshold frequency region. That is, the determination unit 543 may perform S450 when the amplitude Ar of the vibration of the vibration sensor 510 is greater than or equal to the threshold amplitude ATH.

For example, as shown in FIG. 9, when the amplitude Ar of the vibration of the vibration sensor 510 is amplitude "a" Ara, the determination unit 543 determines whether amplitude "a" Ara is greater than or equal to the threshold amplitude ATH. Since amplitude "a" Ara is greater than the threshold amplitude ATH, the determination unit 543 may determine that amplitude "a" Ara is greater than or equal to the threshold amplitude ATH. Accordingly, the determination unit 543 may perform the operation of determining whether frequency "a" Fra is included in the first threshold frequency region (S450).

Also, the determination unit 543 compares the amplitude Ar of the vibration of the vibration sensor 510 to the threshold amplitude ATH. When the amplitude Ar of the vibration of the vibration sensor 510 is smaller than the threshold amplitude ATH, the determination unit 543 determines that the display device 10 is a defective product (S492 in FIG. 10).

For example, as shown in FIG. 9, when the amplitude Ar of the vibration of the vibration sensor 510 is amplitude "c" Arc, the determination unit 543 determines whether amplitude "c" Arc is greater than or equal to the threshold amplitude ATH. Since amplitude "c" Arc is smaller than the threshold amplitude ATH, the determination unit 543 may determine that amplitude "c" Arc is smaller than the threshold amplitude ATH. Accordingly, when the amplitude Ar of the vibration of the vibration sensor 510 is amplitude "c" Arc, the determination unit 543 may determine that the display device is a defective product.

Figure 11:
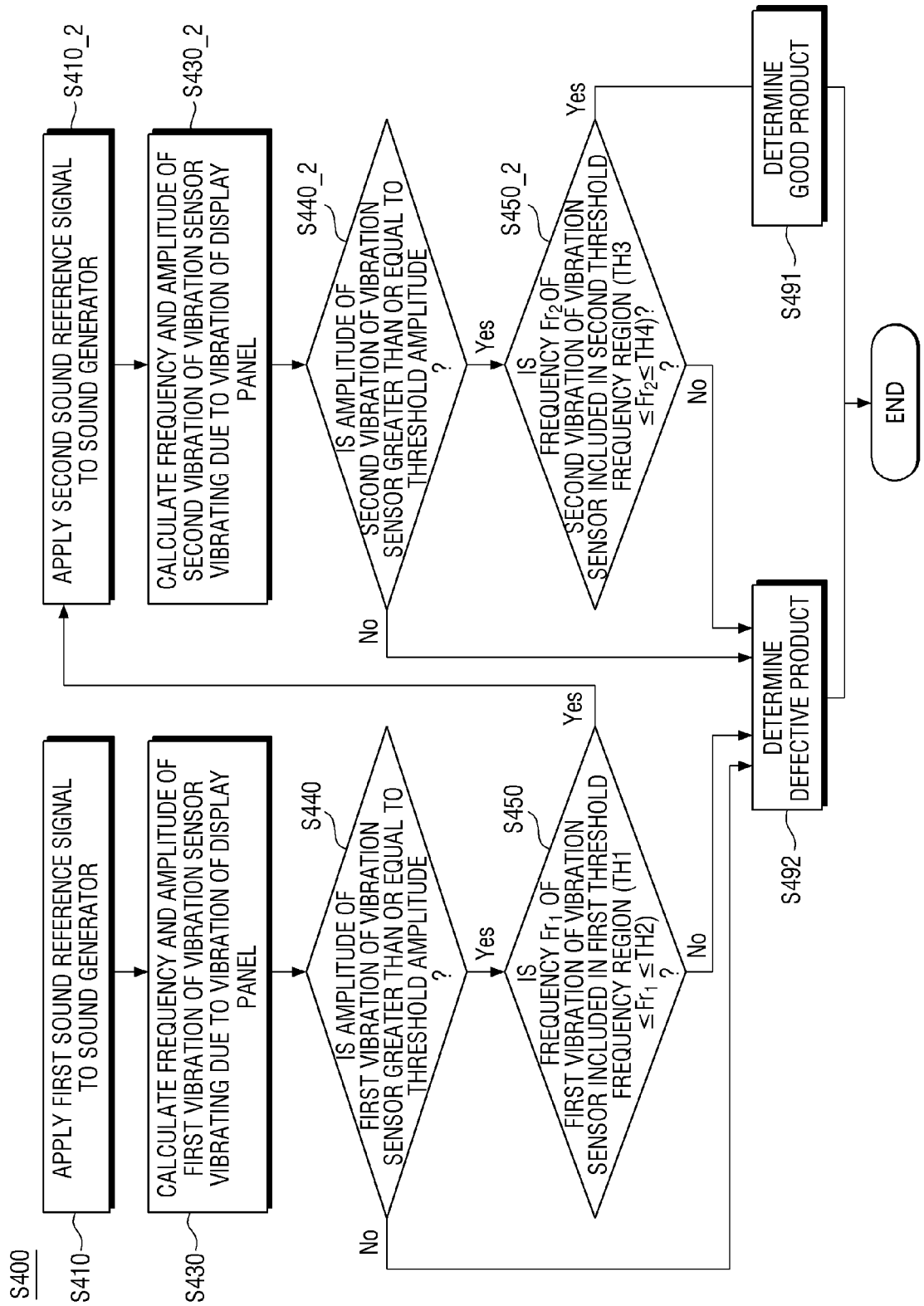
FIG. 11 is a flowchart showing still another example of S400 in FIG. 7 in detail.

FIG. 11 is a flowchart showing still another example of S400 in FIG. 7 in detail.

Figure 12:
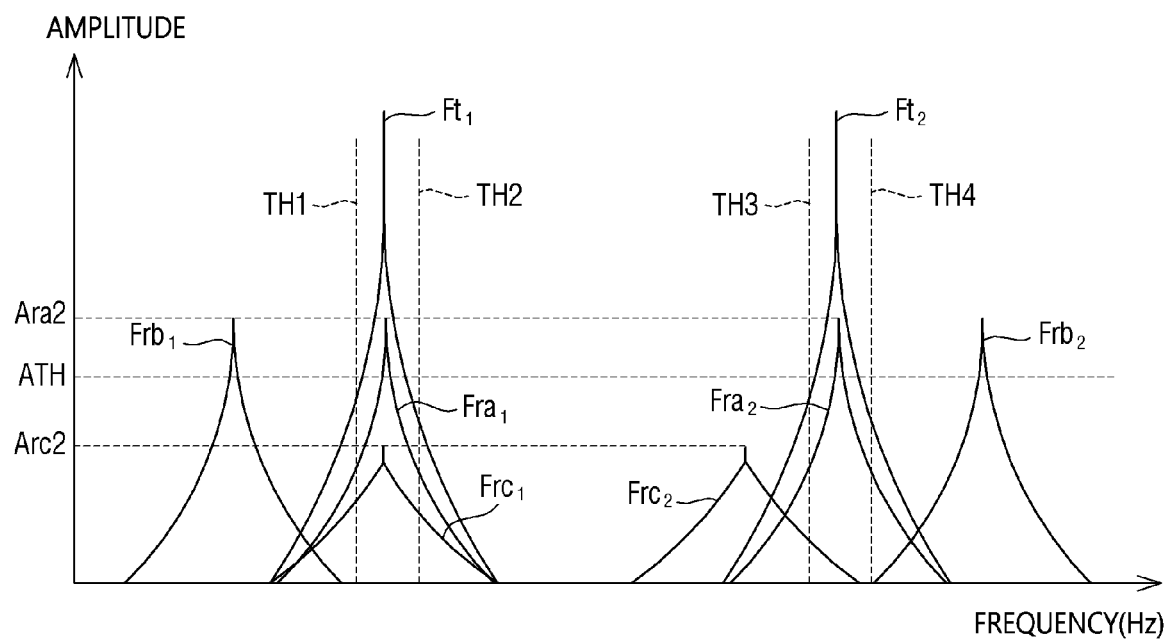
FIG. 12 is a graph showing another example of the frequency and amplitude of a vibration sensed by a vibration sensor and the frequency and amplitude of a sound reference signal applied to the sound generator of FIG. 7.

FIG. 12 is a graph showing another example of the frequency and amplitude of a vibration sensed by a vibration sensor and the frequency and amplitude of a sound reference signal applied to the sound generator of FIG. 7.

The exemplary embodiment shown in FIG. 11 is different from the exemplary embodiment shown in FIG. 10 in that when it is determined that the frequency Fr of the vibration of the vibration sensor 510 is included in the first threshold frequency region in S450, the above-described sound inspection operations are performed once more by applying a second sound reference signal different from the first sound reference signal to the sound generator 310. In the following description with reference to FIG. 11, the parts that have been described with reference to the exemplary embodiment shown in FIG. 10 will be omitted.

In this exemplary embodiment, the sound reference signal that has described with reference to FIGS. 8 and 10 is the first sound reference signal, and the frequency Fr and amplitude Ar of the vibration of the vibration sensor 510 may be replaced with the frequency $Fr_1$ and amplitude $Ar_1$ of the vibration sensor 510.

Referring to FIGS. 6, 11, and 12, the sound inspection method of the display device 10 according to an exemplary embodiment includes applying the second sound reference signal to the sound generator 310 when it is determined that the frequency $Fr_1$ of a first vibration of the vibration sensor 510 is included in the first threshold frequency region in S450 (S410_2)

The sound reference signal applied to the sound generator 310 may include a first driving voltage and a second driving voltage applied in the form of an alternating current according to the second reference frequency $Ft_2$. The second reference frequency $Ft_2$ may be different from the first reference frequency $Ft_1$. The sound generator 310 may vibrate with the second reference frequency $Ft_2$ in the thickness direction of the sound generator 310. The display panel 100 may vibrate along with the vibration of the sound generator 310 in the thickness direction of the display panel 100.

After S410_2, the frequency $Fr_2$ and amplitude $Ar_2$ of a second vibration of the vibration sensor 510 vibrating along with the vibration of the display panel 100 are calculated (S430_2 in FIG. 11).

The voltage sensing unit 542 may convert the voltage of the second vibration electrode 513 sensed by the second vibration of the vibration sensor 510 into sensing voltage data VD and output the sensing voltage data VD to the determination unit 543. The determination unit 543 may analyze the sensing voltage data VD and calculate the frequency $Fr_2$ and amplitude $Ar_2$ of the second vibration of the vibration sensor 510.

After S430_2, the determination unit 543 determines whether the amplitude $Ar_2$ of the second vibration of the vibration sensor 510 is greater than or equal to the threshold amplitude ATH (S440_2 in FIG. 11). The determination unit 543 may compare the amplitude $Ar_2$ of the second vibration of the vibration sensor 510 to the threshold amplitude ATH.

As shown in FIG. 12, when the amplitude $Ar_2$ of the second vibration is amplitude "$a_2$" $Ara_2$, the determination unit 543 determines whether amplitude "$a_2$" $Ara_2$ is greater than or equal to the threshold amplitude ATH. Since amplitude "$a_2$" $Ara_2$ is greater than the threshold amplitude ATH, the determination unit 543 may determine that amplitude "$a_2$" $Ara_2$ is greater than or equal to the threshold amplitude ATH.

Also, as shown in FIG. 12, when the amplitude $Ar_2$ of the second vibration is amplitude "$c_2$" $Arc_2$, the determination unit 543 determines whether amplitude "$c_2$" $Arc_2$ is greater than or equal to the threshold amplitude ATH. Since amplitude "$c_2$" $Arc_2$ is smaller than the threshold amplitude ATH, the determination unit 543 may determine that amplitude "$c_2$" $Arc_2$ is smaller than the threshold amplitude ATH.

After S440_2, when it is determined that the amplitude $Ar_2$ of the second vibration of the vibration sensor 510 is smaller than the threshold amplitude ATH, the determination unit 543 determines that the display device 10 is a defective product (S492 in FIG. 11).

For example, as shown in FIG. 12, when the amplitude $Ar_2$ of the second vibration of the vibration sensor 510 is amplitude "$c_2$" $Arc_2$, the determination unit 543 may determine that the display device 10 is a defective product because amplitude "$c_2$" $Arc_2$ is smaller than the threshold amplitude ATH.

Also, after S440_2, when it is determined that the amplitude $Ar_2$ of the second vibration of the vibration sensor 510 is greater than or equal to the threshold amplitude ATH, the determination unit 543 determines whether the frequency $Fr_2$ of the second vibration of the vibration sensor 510 is included in a second threshold frequency region (S450_2 in FIG. 11).

The determination unit 543 may compare the calculated frequency $Fr_2$ of the second vibration of the vibration sensor 510 to the predetermined second threshold frequency region. The second threshold frequency region may be greater than or equal to a third threshold frequency TH3 and may be less than or equal to a fourth threshold frequency TH4 higher than the third threshold frequency TH3. The third threshold frequency TH3 may be different from the first threshold frequency TH1. Also, the fourth threshold frequency TH4 may be different from the second threshold frequency TH2. The second threshold frequency region may include the second reference frequency $Ft_2$. That is, the second reference frequency $Ft_2$ may be greater than or equal to the third threshold frequency TH3 and smaller than or equal to the fourth threshold frequency TH4, For example, as shown in FIG. 12, when the frequency $Fr_2$ of the second vibration of the vibration sensor 510 is frequency "$a_2$" $Fra_2$, the determination unit 543 determines that frequency "$a_2$" $Fra_2$ is included in the second threshold frequency region. Since frequency "$a_2$" $Fra_2$ is greater than or equal to the third threshold frequency TH3 and less than or equal to the fourth threshold frequency TH4, the determination unit 543 may determine that frequency "$a_2$" $Fra_2$ is included in the second threshold frequency region.

Also, as shown in FIG. 12, when the frequency $Fr_2$ of the second vibration of the vibration sensor 510 is frequency "$b_2$" $Frb_2$, the determination unit 543 determines that frequency "$b_2$" $Frb_2$ is included in the second threshold frequency region. Since frequency "$b_2$" $Frb_2$ is greater than the fourth threshold frequency TH4, the determination unit 543 may determine that frequency "$b_2$" $Frb_2$ is not included in the second threshold frequency region.

After S450_2, when it is determined that the frequency $Fr_2$ of the second vibration of the vibration sensor 510 is included in the second threshold frequency region, the determination unit 543 determines that the display device 10 is a good product (S491 in FIG. 11).

For example, as shown in FIG. 12, when the frequency $Fr_2$ of the second vibration of the vibration sensor 510 is frequency "$a_2$" $Fra_2$, the determination unit 543 may determine that the display device 10 is a good product because frequency "$a_2$" $Fra_2$ is included in the second threshold frequency region.

Also, after S450_2, when it is determined that the frequency $Fr_2$ of the second vibration of the vibration sensor 510 is not present in the second threshold frequency region, the determination unit 543 determines that the display device 10 is a defective product (S492 in FIG. 11).

For example, as shown in FIG. 12, when the frequency $Fr_2$ of the second vibration of the vibration sensor 510 is frequency "$b_2$" $Frb_2$, the determination unit 543 may determine that frequency "$b_2$" $Frb_2$ is not present in the second threshold frequency region because frequency "$b_2$" $Frb_2$ is greater than the fourth threshold frequency TH4. Accordingly, since frequency "$b_2$" $Frb_2$ is not present in the second threshold frequency region, the determination unit 543 may determine that the display device 10 is a defective product. Although not shown, difference sound reference signals may be applied to the sound generator 310 three or more times. In this case, a sound inspection for determining whether the sound generator 310 of the display device 10 is a good product or a defective product may be repeatedly performed, and thus, it is possible to increase reliability in the sound inspection.

Figure 13:
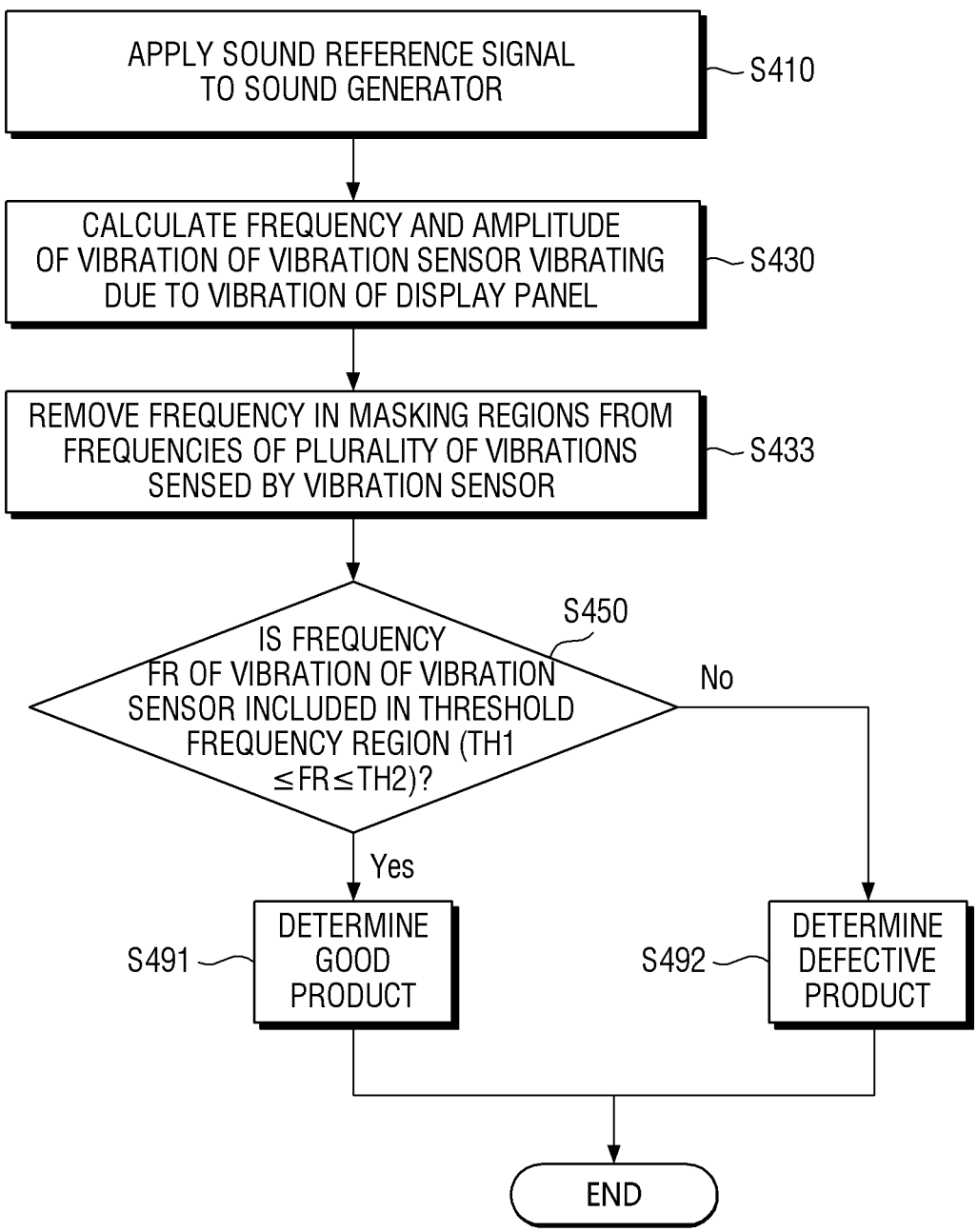
FIG. 13 is a flowchart showing yet another example of S400 in FIG. 7 in detail.
Figure 14:
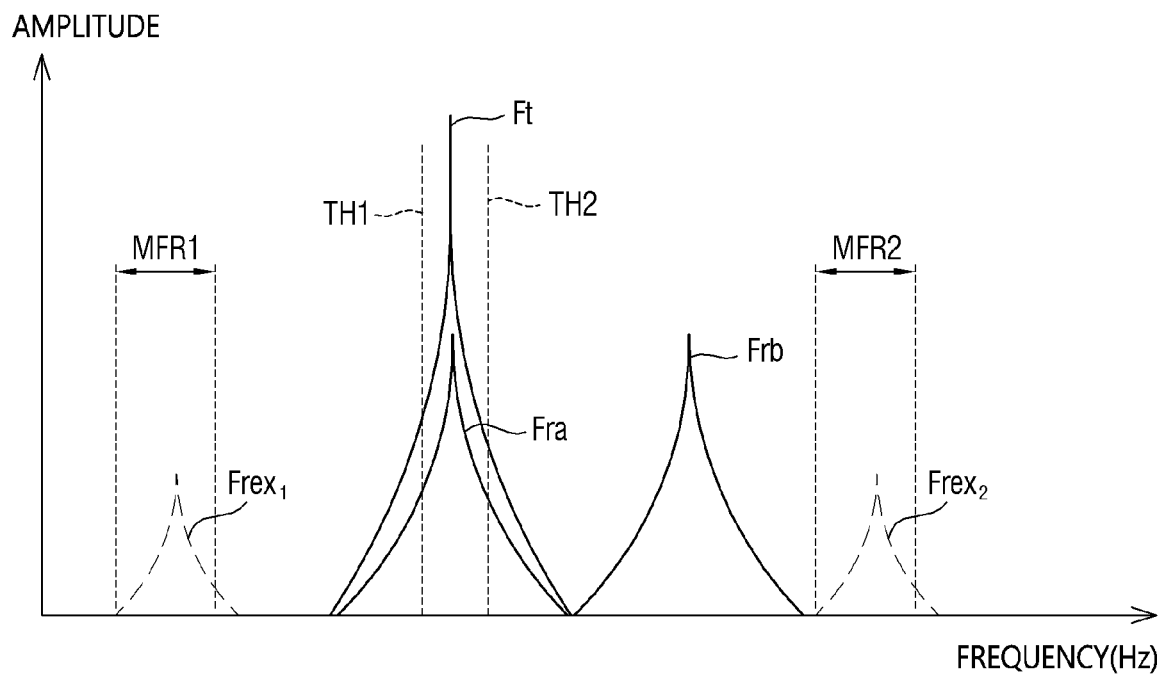
FIG. 14 is a graph showing still another example of the frequency and amplitude of a vibration sensed by a vibration sensor and the frequency and amplitude of a sound reference signal applied to the sound generator of FIG. 7.

FIG. 13 is a flowchart showing yet another example of S400 in FIG. 7 in detail. FIG. 14 is a graph showing still another example of the frequency and amplitude of a vibration sensed by a vibration sensor and the frequency and amplitude of a sound reference signal applied to the sound generator of FIG. 7.

The embodiment shown in FIG. 13 is different from the exemplary embodiment shown in FIG. 8 in that an operation of removing the vibration of the vibration sensor included in a masking frequency region (S433) is additionally included, which would be performed between S430 and S450. In the following description with reference to FIG. 13, the parts that have been described with reference to the exemplary embodiment shown in FIG. 8 will be omitted.

Referring to FIGS. 6, 13, and 14, the sound inspection method of the display device according to an exemplary embodiment may include an operation of removing the vibration of the vibration sensor 510 included in the masking frequency region (S433) which would be performed between S430 and S450.

The determination unit 543 may compare the calculated frequency Fr of the vibration of the vibration sensor 510 to a predetermined masking frequency region. The masking frequency region may include the frequency of a vibration repeatedly generated in an inspection environment. For example, the making frequency region may include at least one region. The vibration that may be repeatedly generated in the inspection environment may be, for example, an external vibration inevitably generated in the inspection environment or a vibration caused by a repeatedly driven machine around the inspection environment. Information regarding the vibration caused by the repeatedly driven machine in the inspection environment may be stored in a masking region of the sound inspection device 500.

As shown in FIG. 14, the masking frequency region may include a first masking frequency region MFR1 and a second masking frequency region MFR2 different from the first masking frequency region MRF1. When the frequency Fr of the vibration of the vibration sensor 510 includes frequency "$ex_1$" $Frex_1$, frequency "$ex_2$" $Frex_2$, and frequency "a" Fra, the determination unit 543 may determine whether the frequencies $Frex_1$, $Frex_2$, and Fra of the vibration of the vibration sensor 510 are included in the masking frequency regions MRF1 and masking frequency region MFR2. The determination unit 543 may determine that frequency "$ex_1$" $Frex_1$ is included in the first masking frequency region MFR1 and frequency "$ex_2$" $Frex_2$ is included in the second masking frequency region MFR2. The determination unit 543 may remove, from vibrations with the frequencies $Frex_1$, $Frex_2$, and Fra, the vibration with frequency "$ex_1$" $Frex_1$ and the vibration with frequency "$ex_2$" $Frex_2$. Therefore, the frequency Fr of the vibration of the vibration sensor 510 that determines whether it is included in the threshold frequency region in S450 may be frequency "a" Fra other than frequency "$ex_1$" $Frex_1$ and frequency "$ex_f$" $Frex_2$.

The masking frequency region is shown as including only the first masking frequency region MFR1 and the second masking frequency region MFR2, but the present invention is not limited thereto. The number and ranges of masking frequency regions are not particularly limited and may vary.

According to the embodiment shown in FIGS. 13 and 14, when the vibration of the masking region is included in the vibration sensed by the vibration sensor 510, the sound inspection device 500 may perform a sound inspection using the vibration of the vibration sensor excluding the vibration of the masking region. When the sound inspection is performed without removing the vibration included in the masking region, the vibration sensor 510 may also sense an external vibration generated in the inspection environment as well as the vibration of the display panel 100. In this case, the display device 10, which is a good product, may be mistakenly determined as a defective product. Accordingly, by learning, storing, and removing the external vibration generated in the inspection environment, it is possible to prevent the display device 10 from being determined as a defective product due to a vibration generated by a repeatedly driven machine.

Figure 15:
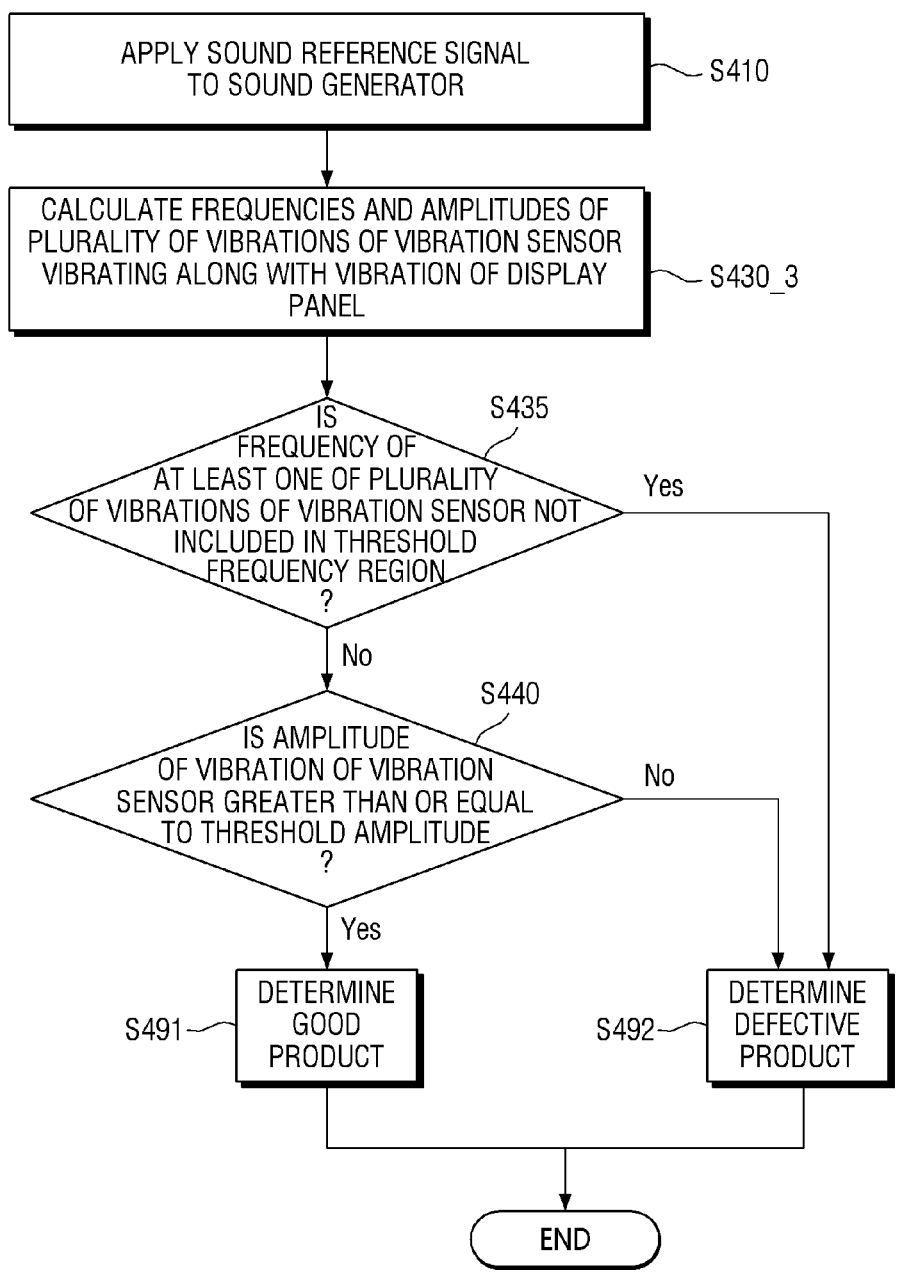
FIG. 15 is a flowchart showing yet another example of S400 in FIG. 7 in detail.

FIG. 15 is a flowchart showing yet another example of S400 in FIG. 7 in detail.

Figure 16:
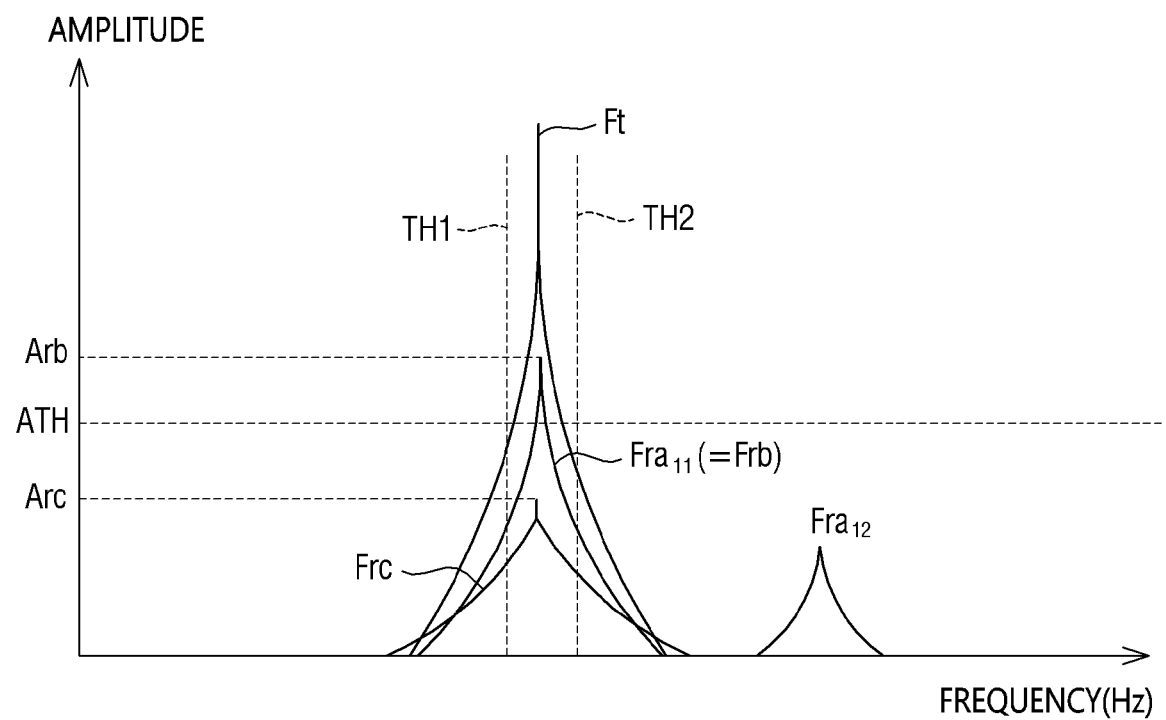
FIG. 16 is a graph showing yet another example of the frequency and amplitude of a vibration sensed by a vibration sensor and the frequency and amplitude of a sound reference signal applied to the sound generator of FIG. 7.

FIG. 16 is a graph showing yet another example of the frequency and amplitude of a vibration sensed by a vibration sensor and the frequency and amplitude of a sound reference signal applied to the sound generator of FIG. 7.

The exemplary embodiment shown in FIG. 15 is different from the aforementioned embodiments in that the vibration of the vibration sensor 510 vibrating along with the vibration of the display panel 100 includes a plurality of vibrations. In the following description with reference to FIG. 10, the parts that have been described about S410 and the following operations will be omitted.

Referring to FIGS. 6, 15, and 16, after S410, the frequencies Fr and amplitudes Ar of a plurality of vibrations Fr of the vibration sensor 510 vibrating along with the vibration of the display panel 100 are calculated (S430_3 in FIG. 15).

The vibration of the vibration sensor 510 may include a plurality of vibrations. The voltage sensing unit 542 may sense a plurality of voltages of the second vibration electrode 513 by the plurality of vibrations of the vibration sensor 510. The analog-to-digital converter of the voltage sensing unit 542 may convert the plurality of voltages into a plurality of pieces of sensing voltage data VD, which is digital data. When the sensing voltage data VD is received from the voltage sensing unit 542, the determination unit 543 may analyze the sensing voltage data VD, calculate the voltage change period and voltage magnitude of each piece of the sensing voltage data VD, and calculate a plurality of vibration frequencies Fr and amplitudes of the vibration sensor 510.

After S430_3, the determination unit 543 determines whether the frequency of at least one of the plurality of vibrations of the vibration sensor 510 is not included in the first threshold frequency region (S435 in FIG. 15). The determination unit 543 may compare the calculated vibrations of the vibration sensor 510 to the predetermined first threshold frequency region.

As shown in FIG. 16, when the frequencies of the plurality of vibrations of the vibration sensor 510 include frequency "$a_{11}$" $Fra_{11}$ and frequency "$a_{12}$" $Fra_{12}$, the determination unit 543 determines that at least one of frequency "$a_{11}$" $Fra_{11}$ and frequency "$a_{12}$" $Fra_{12}$ is included in the first threshold frequency region. Since frequency "$a_{11}$" $Fra_{11}$ is greater than or equal to the first threshold frequency TH1 and less than or equal to the second threshold frequency TH2, the determination unit 543 may determine that frequency "$a_{11}$" $Fra_{11}$ is included in the first threshold frequency region. Also, since frequency "$a_{12}$" $Fra_{12}$ is greater than the second threshold frequency TH2, the determination unit 543 may determine that frequency "$a_{12}$" $Fra_{12}$ is not included in the first threshold frequency region.

When it is determined that at least one of the plurality of vibrations of the vibration sensor 510 is not included in the first threshold frequency region in S435, the determination unit 543 determines that the display device 10 is a defective product (S492 in FIG. 15).

When it is determined that all the vibrations of the vibration sensor 510 are included in the first threshold frequency region in S435, the determination unit 543 may perform the operation of determining whether the amplitude Ar of the vibration of the vibration sensor 510 is greater than or equal to the threshold amplitude ATH (S440).

Figure 17:
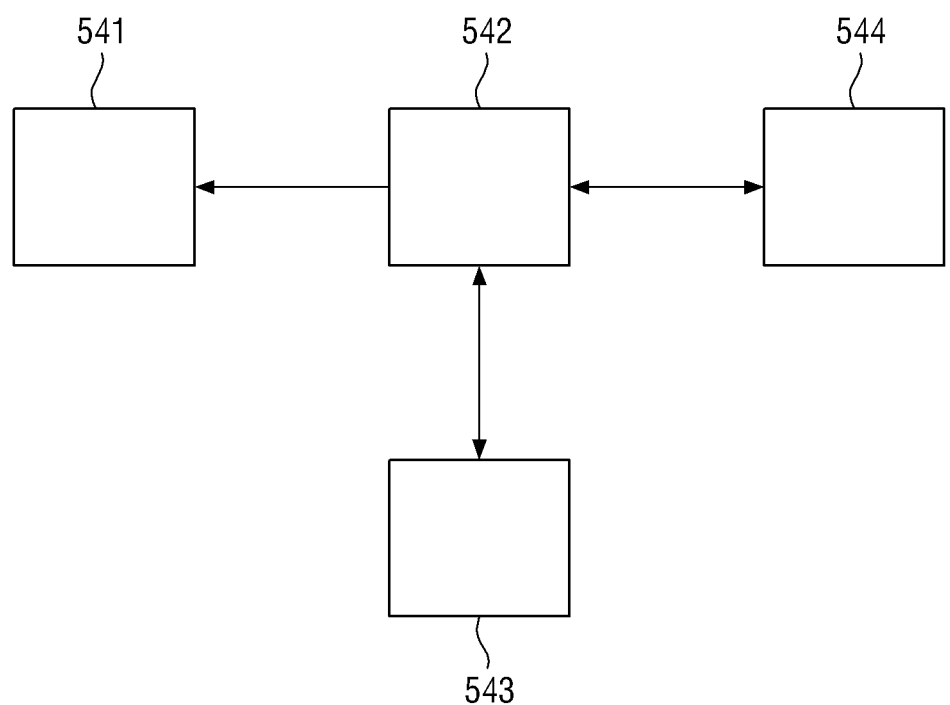
FIG. 17 is a block diagram of a sound inspection device according to another exemplary embodiment of the present invention.
Figure 18:
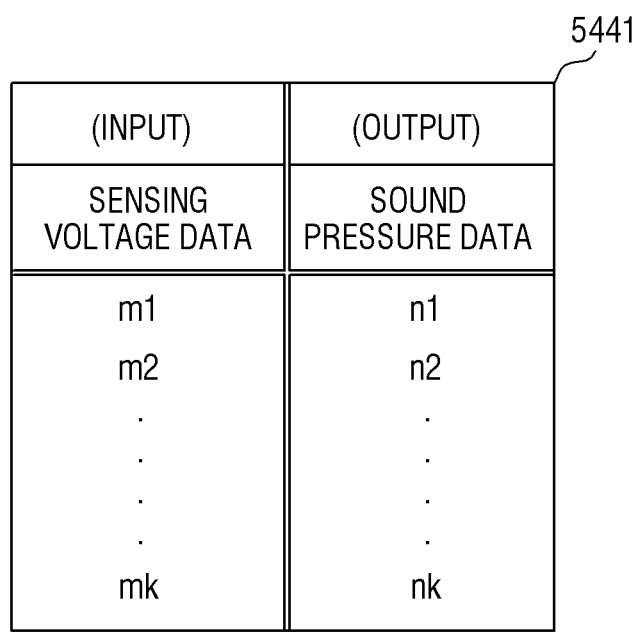
FIG. 18 is an example diagram showing an example of a lookup table where sound decibel values corresponding to the amplitude of the vibration sensor are stored.

FIG. 17 is a block diagram of a sound inspection device according to another embodiment. FIG. 18 is an example diagram showing an example of a lookup table where sound decibel values corresponding to the amplitude of the vibration sensor are stored.

Referring to FIGS. 17 and 18, the sound inspection device 500 may further include a memory unit 544 including a lookup table 5441. The lookup table 5441 may store sound pressure data n1, n2, . . . , and nk including sound pressure level (dB) information corresponding to the sensing voltage data m1, m2, . . . , and mk as shown in FIG. 18. The sound pressure data may be a value corresponding to the amplitude of the vibration of the vibration sensor 510.

The lookup table 5441 may output the sound pressure data to the determination unit 543 by using the sensing voltage data VD input from the voltage sensing unit 542 as an input address. For example, when sensing voltage data having a value of m1 is input, the lookup table 5441 may output sound pressure data having a value of n1 to the determination unit 543. The determination unit 543 may compare the sound pressure data received from the lookup table 5441 to threshold sound data. For example, the threshold sound data may be a threshold sound pressure level. The determination unit 543 may determine whether the sound generator 310 is a good product by comparing the sound pressure data to the threshold sound pressure level.

With the sound inspection method and device of the display device including the sound generator according to an exemplary embodiment, determination is made of whether the frequency of the vibration of the vibration sensor for sensing the vibration of the display panel is matched with the frequency of the sound reference signal of the sound generator, and the sound output by the sound generator is sensed and inspected in the form of a vibration. Accordingly, since whether the sound generator is a good product is inspected by the vibration sensor sensing the vibration of the display panel that is vibrating due to the vibration of the sound generator, noise generated in the inspection environment may not be sensed by the vibration sensor. Thus, it is possible to prevent noise generated in the inspection environment from affecting a sound inspection compared to a case of sensing sounds output due to the vibration of the display panel caused by the sound generator by means of a microphone and inspecting the sounds output by the sound generator.

Also, with the sound inspection method and device of the display device including the sound generator according to an embodiment, there is no need to install a sound shielding member or a sound absorbing member in the sound inspection device so that noise is prevented from affecting a sound inspection, and thus, it is possible to reduce costs.

Also, with the sound inspection method and device of the display device including the sound generator according to an embodiment, by learning, storing, and removing an external vibration generated in the inspection environment in advance, it is possible to prevent the display device which is a good product from being determined as a defective product due to a vibration generated by a repeatedly driven machine.

The present invention is not limited to the aforementioned advantageous effects, and other various effects are included in this specification.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A sound inspection method of a display device, the sound inspection method comprising:
    preparing a display device including a display panel and a sound generator disposed on a first surface of the display panel;
    placing a vibration sensor on a second surface opposite to the first surface of the display panel;
    vibrating the sound generator at a first reference frequency, vibrating the display panel, and then sensing a vibration of the vibration sensor that vibrates along with a vibration of the display panel;
    removing the vibration of the vibration sensor included in a masking frequency region; and
    determining whether a frequency of the vibration of the vibration sensor is included in a first threshold frequency region.

2. The sound inspection method of claim 1, wherein:
    the first threshold frequency region includes a first representative threshold frequency, and
    the sound inspection method further comprises:
        determining that the display device is a good product when the frequency of the vibration of the vibration sensor is the same as the first representative threshold frequency; and
        determining that the display device is a defective product when the frequency of the vibration of the vibration sensor is different from the first representative threshold frequency.

3. The sound inspection method of claim 2, wherein the first representative threshold frequency is the same as the first reference frequency of the sound generator.

4. The sound inspection method of claim 1, wherein the first threshold frequency region is a range of frequencies that are greater than or equal to a first threshold frequency and less than or equal to a second threshold frequency higher than the first threshold frequency.

5. The sound inspection method of claim 4, wherein the first reference frequency of the sound generator is greater than or equal to the first threshold frequency and less than or equal to the second threshold frequency.

6. The sound inspection method of claim 4, further comprising:
    determining that the display device is a good product when the frequency of the vibration of the vibration sensor is included in the first threshold frequency region; and
    determining that the display device is a defective product when the frequency of the vibration of the vibration sensor is not included in the first threshold frequency region.

7. The sound inspection method of claim 4, wherein:
    the vibration of the vibration sensor comprises a plurality of vibrations; and
    the sound inspection method further comprises determining that the display device is a defective product when the frequency of at least one of the plurality of vibrations is not included in the first threshold frequency region.

8. The sound inspection method of claim 1, further comprising comparing an amplitude of the vibration of the vibration sensor to a threshold amplitude when the frequency of the vibration of the vibration sensor is included in the first threshold frequency region.

9. The sound inspection method of claim 8, wherein the comparing of the amplitude of the vibration of the vibration sensor to the threshold amplitude comprises:
    determining that the display device is a good product when the amplitude of the vibration of the vibration sensor is greater than or equal to the threshold amplitude; and
    determining that the display device is a defective product when the amplitude of the vibration of the vibration sensor is smaller than the threshold amplitude.

10. The sound inspection method of claim 1, further comprising comparing an amplitude of the vibration of the vibration sensor to a threshold amplitude before determining whether the frequency of the vibration of the vibration sensor is included in the first threshold frequency region.

11. The sound inspection method of claim 10, wherein the comparing of the amplitude of the vibration of the vibration sensor to the threshold amplitude comprises:
    determining whether the frequency of the vibration of the vibration sensor is included in the first threshold frequency region when the amplitude of the vibration of the vibration sensor is greater than or equal to the threshold amplitude; and
    determining that the display device is a defective product when the amplitude of the vibration of the vibration sensor is smaller than the threshold amplitude.

12. The sound inspection method of claim 11, further comprising:
    determining that the display device is a good product when the frequency of the vibration of the vibration sensor is included in the first threshold frequency region; and
    determining that the display device is a defective product when the frequency of the vibration of the vibration sensor is not included in the first threshold frequency region.

13. The sound inspection method of claim 1, wherein:
    the vibration of the vibration sensor comprises vibration with a frequency A and vibration with a frequency B; and
    the removing of the vibration of the vibration sensor included in the masking frequency region comprises removing vibration with a frequency which is one of the frequency A and the frequency B and which is included in the masking frequency region.

14. A sound inspection method of a display device, the sound inspection method comprising:
    preparing a display device including a display panel and a sound generator disposed on a first surface of the display panel;

placing a vibration sensor on a second surface opposite to the first surface of the display panel;

vibrating the sound generator at a first reference frequency, vibrating the display panel, and then sensing a vibration of the vibration sensor that vibrates along with a vibration of the display panel;

determining whether a frequency of the vibration of the vibration sensor is included in a first threshold frequency region;

vibrating the sound generator at a second reference frequency, vibrating the display panel, and sensing a second vibration of the vibration sensor that vibrates along with the vibration of the display panel when a frequency of a first vibration of the vibration sensor is included in the first threshold frequency region; and determining whether a frequency of the second vibration of the vibration sensor is included in a second threshold frequency region.

15. The sound inspection method of claim 14, further comprising:

determining that the display device is a defective product when the frequency of the first vibration of the vibration sensor is not included in the first threshold frequency region;

determining that the display device is a good product when the frequency of the second vibration of the vibration sensor is included in the second threshold frequency region; and determining that the display device is a defective product when the frequency of the second vibration of the vibration sensor is not included in the second threshold frequency region.

16. The sound inspection method of claim 14, wherein:

the second reference frequency is different from the first reference frequency;

the second threshold frequency region is a range of frequencies extending from a third threshold frequency different from a first threshold frequency to a fourth threshold frequency;

which is different from a second threshold frequency and higher than the third threshold frequency, and the second reference frequency is included in the second threshold frequency region.

17. The sound inspection method of claim 14, wherein the first threshold frequency region is a range of frequencies that is greater than or equal to a first threshold frequency and less than or equal to a second threshold frequency higher than the first threshold frequency.

18. A sound inspection device of a display device including a display panel and a sound generator disposed on a first surface of the display panel, the sound inspection device comprising:

a support frame configured to support the display panel;

a vibration sensor spaced apart from the support frame;

a voltage sensing unit configured to sense a vibration of the vibration sensor; and a determination unit configured to remove the vibration of the vibration sensor included in a masking frequency region, compare a frequency of the vibration of the vibration sensor sensed by the voltage sensing unit to a threshold frequency region, and determine whether the sound generator of the display device is a good product or a defective product.

19. The sound inspection device of claim 18, further comprising a sound driving unit electrically connected to the sound generator and configured to apply a sound reference signal when the display panel is disposed on the support frame.

20. The sound inspection device of claim 18, wherein the vibration sensor is disposed on a second surface of the display panel when the display panel is disposed on the support frame.

21. The sound inspection device of claim 18, wherein the vibration sensor comprises:

a first vibration electrode and a second vibration electrode electrically insulated from each other; and a first vibration layer disposed between the first vibration electrode and the second vibration electrode.

22. The sound inspection device of claim 21, wherein the first vibration layer contains a piezoelectric material or polyvinylidene fluoride (PVDF).

23. The sound inspection device of claim 21, wherein:

the sound generator comprises:

a first electrode and a second electrode electrically insulated from each other; and a second vibration layer disposed between the first electrode and the second electrode; and the first vibration layer of the vibration sensor and the second vibration layer of the sound generator include the same material.

24. The sound inspection device of claim 21, wherein:

the voltage sensing unit applies a first vibration driving voltage to the first vibration electrode; and the voltage sensing unit senses a change in voltage of the second vibration electrode and outputs the voltage change to the determination unit.

25. The sound inspection device of claim 24, wherein the determination unit:

calculates the frequency of the vibration of the vibration sensor according to the voltage change of the second vibration electrode;

determines that the display device is a good product when the frequency of the vibration of the vibration sensor is included in the threshold frequency region; and determines that the display device is a defective product when the frequency of the vibration of the vibration sensor is not included in the threshold frequency region.

26. The sound inspection device of claim 24, wherein:

the determination unit calculates an amplitude of the vibration of the vibration sensor according to a magnitude of the voltage of the second vibration electrode;

the sound inspection device further comprises a memory unit configured to store sound data corresponding to the amplitude of the vibration of the vibration sensor;

the voltage sensing unit delivers a sound data value corresponding to the amplitude of the vibration of the vibration sensor from the memory unit to the determination unit; and the determination unit compares the sound data delivered from the voltage sensing unit to a threshold sound data region.

* * * * *